United States Patent
Singh

(10) Patent No.: US 12,555,008 B1
(45) Date of Patent: Feb. 17, 2026

(54) SYSTEMS AND METHODS FOR COGNITIVE INFERENCING FOR LARGE LANGUAGE MODELS

(71) Applicant: DNAi Systems Co., Roslyn, NY (US)

(72) Inventor: Deepan Singh, Roslyn, NY (US)

( * ) Notice: Subject to any disclaimer, the term of this patent is extended or adjusted under 35 U.S.C. 154(b) by 0 days.

(21) Appl. No.: 19/290,471

(22) Filed: Aug. 5, 2025

(51) Int. Cl.
G06N 5/02 (2023.01)
G06N 5/04 (2023.01)

(52) U.S. Cl.
CPC ............... G06N 5/04 (2013.01); G06N 5/02 (2013.01)

(58) Field of Classification Search
CPC ................................ G06N 5/04; G06N 3/042
See application file for complete search history.

(56) References Cited

U.S. PATENT DOCUMENTS

| | | | | |
|---|---|---|---|---|
| 11,799,974 | B2 * | 10/2023 | Lervik | H04L 67/306 |
| 2018/0025020 | A1 * | 1/2018 | Harel | G06F 16/683 707/737 |
| 2019/0213259 | A1 | 7/2019 | Bacarella et al. | |
| 2024/0296279 | A1 | 9/2024 | Gardner | |
| 2025/0111167 | A1 * | 4/2025 | Mcintyre | G06F 16/383 |

FOREIGN PATENT DOCUMENTS

| | | |
|---|---|---|
| CN | 110019751 A | 7/2019 |
| IN | 202541041233 A | 5/2025 |

OTHER PUBLICATIONS

Rasal, Sumedh. "A Multi-LLM Orchestration Engine for Personalized, Context-Rich Assistance." arXiv preprint arXiv:2410.10039 (2024). (Year: 2024).*

* cited by examiner

Primary Examiner — Hal Schnee
(74) Attorney, Agent, or Firm — Caldwell Intellectual Property Law

(57) ABSTRACT

A system for cognitive inferencing for large language models (LLMs), the system including: a integration layer communicatively connected to a static LLM, wherein the integration layer includes a processor configured to receive one or more user requests from a user, wherein the one or more user requests include a user interaction with the static LLM, generate one or more cognitive inference (CI) units from the one or more user requests, assign a confidence-falsifiability (CF) delta for each of the one or more CI units using a Socratic engine and append the one or more CI units and the CF delta to a cognitive inference (CI) log associated with the user, wherein the CI log serves as an inference engine for the static LLM, wherein the integration layer is configured to query the CI log upon a subsequent user interaction with the static LLM.

30 Claims, 11 Drawing Sheets

SYSTEMS AND METHODS FOR COGNITIVE INFERENCING FOR LARGE LANGUAGE MODELS

FIELD OF THE INVENTION

The present invention generally relates to the field of large language models. In particular, the present invention is directed to systems and methods for cognitive inferencing for large language models.

BACKGROUND

Large Language Models (LLMs) process and generate human-like text in response to user inputs across a wide range of domains. However, these models face persistent limitations in reliability, accountability, and reasoning transparency. Specifically, once deployed, LLMs are generally static and cannot adapt dynamically to individual user interactions or retain long-term contextual understanding. As a result, LLM outputs often fail to provide user-specific responses, instead generating answers based on generalized patterns or assumptions about an average user.

SUMMARY OF THE DISCLOSURE

In an aspect, a system for cognitive inferencing for large language models (LLMs) is described. The system includes an integration layer communicatively connected to a static LLM, wherein the integration layer includes a processor and a memory communicatively connected to the processor. The memory contains instructions configuring the processor to receive, through the integration layer, one or more user requests from a user, wherein the one or more user requests include a user interaction with the static LLM, generate one or more cognitive inference (CI) units from the one or more user requests, assign a confidence-falsifiability (CF) delta for each of the one or more CI units using a socratic engine and append the one or more CI units and the CF delta to a cognitive inference (CI) log associated with the user, wherein the CI log serves as an inference engine for the static LLM, wherein the integration layer is configured to query the CI log upon a subsequent user interaction with the static LLM.

In another aspect a method for cognitive inferencing for large language models (LLMs) is described. The method includes receiving, through a integration layer communicatively connected to a static LLM, one or more user requests from a user, wherein the one or more user requests include a user interaction with the static LLM, generating, by a processor, one or more cognitive inference (CI) units from the one or more user requests, assigning, by the processor, a confidence-falsifiability (CF) delta for each of the one or more CI units using a socratic engine and appending, by the processor, the one or more CI units and the CF delta to a cognitive inference (CI) log associated with the user, wherein the CI log serves as an inference engine for the static LLM and wherein the integration layer is configured to query the CI log upon a subsequent user interaction with the static LLM.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
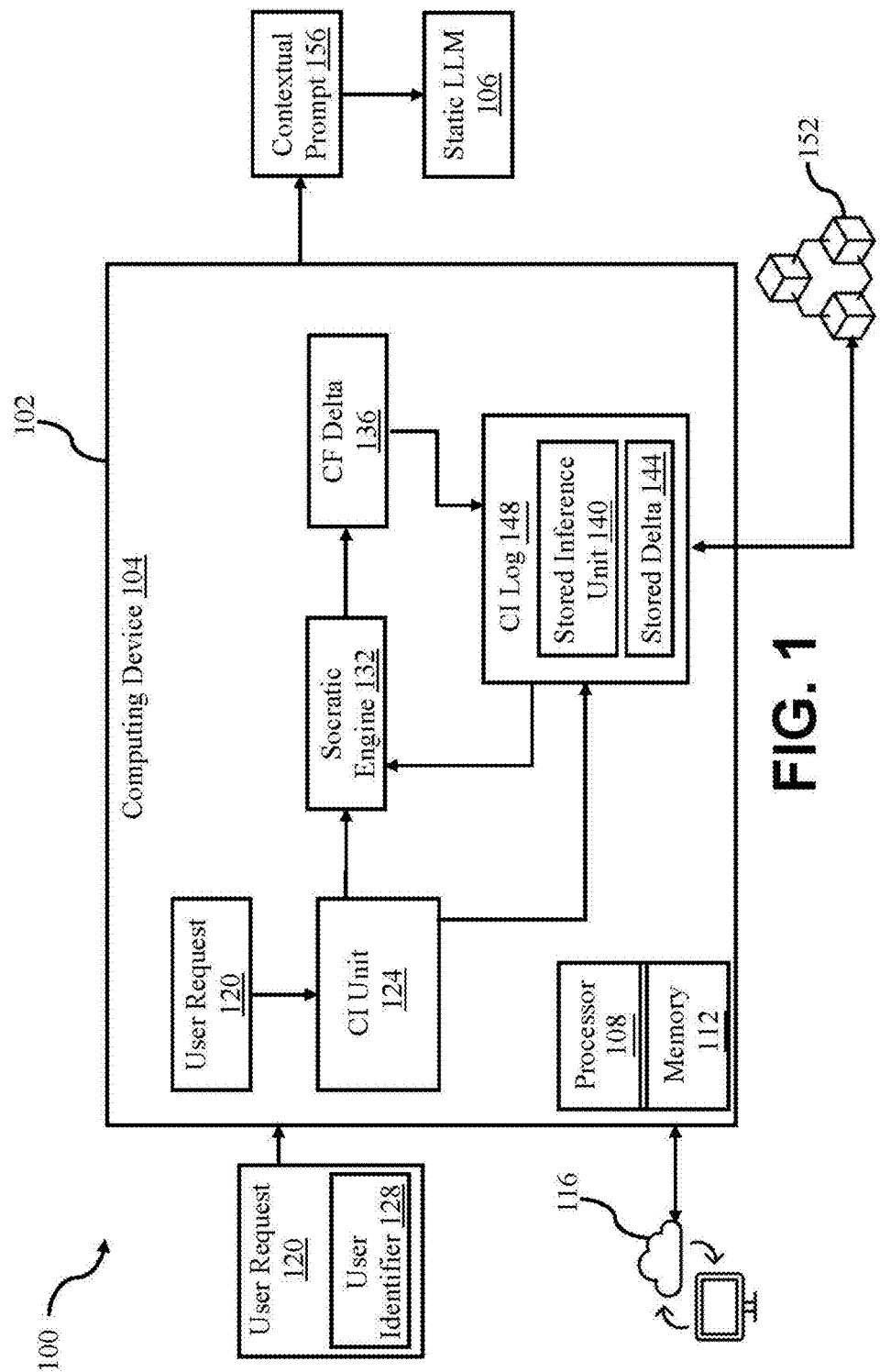
FIG. 1 is a block diagram illustrating an exemplary embodiment for a system for cognitive inferencing for large language models.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for enabling persistent, adaptive, and auditable memory in AI agent interactions through a Cognitive Inference Ledger (CI log). In an embodiment, the system integrates memory storage, inference validation, agent-specific modularity, and blockchain-based auditability to allow large language model (LLM)-based agents to simulate contextual continuity and human-like episodic memory without retraining the LLM itself.

Aspects of the present disclosure can be used to deploy personalized AI agents that retain contextual understanding across user sessions and adapt their responses based on prior validated knowledge. Aspects of the present disclosure can also be used to ensure that AI-generated inferences are falsifiable, traceable, and ethically bound to a specific user through secure identity contracts. This is so, at least in part, because the system employs a layered architecture, including CI units, a falsification engine (Socratic engine), a smart contract identity layer, and a quantum ledger memory structure, that enables modular inference, memory recall, and secure interaction tracking.

In one or more embodiments, aspects of the present disclosure may allow for persistent and personalized AI simulation, wherein user-specific context is maintained across sessions, thereby overcoming limitations associated with stateless interactions in current large language models. In one or more embodiments, aspects of the present enable transparent and traceable cognitive inference through the use of validated and falsifiable inference units, ensuring both explainability and accountability in AI reasoning processes.

In one or more embodiments, aspects of the present disclosure allow for agent-specific identity and ethics control to be provided, allowing for the deployment of uniquely identifiable AI agents that are bound to individual user profiles and ethical configurations. In one or more embodiments, aspects of the present disclosure may include a simulation engine wherein contextual continuity is preserved via a dedicated memory ledger, obviating the need for costly retraining procedures. Moreover, security and regulatory compliance may be enhanced through the integration of blockchain technologies, which furnish tamper-proof memory architectures and immutable audit trails, thereby supporting robust data integrity and traceability.

Unlike AI systems that may operate in stateless or transient modes, the present system may instantiates fiduciary agents for legal advisement, pediatric triage and the like whose behavioral scope is bounded by simulation contracts, memory constraints, and role-specific ethical frameworks. These agents may recall past CI trails, resume paused simulations, and act only within predefined domains enforced through command-based sandboxing and audit trail integrity. In one or more embodiments, Agent identifiers as described below may allow for the creation of agents with predetermined roles and/or tasks.

Aspects of the present disclosure allow for a static LLM 106 to behave in a dynamic, personalized, and compliant manner through contextual prompting derived from a continuously updating inference log. Exemplary embodiments illustrating aspects of the present disclosure are described below in the context of several specific examples.

Aspects of the present disclosure may be used to identify, assess, and therapeutically modulate human temporal cognition using AI-driven inference agents. Such agents may interact with peripheral nodes or deliver therapeutic experiences through guided language-based interventions, with or without linked hardware. These interventions are intended to adjust internal time perception and support cognitive-behavioral regulation, particularly in neurodevelopmental or neuropsychiatric contexts. For example, in some embodiments, the systems described below be used to realize language-based temporal modulation interventions.

With continued reference to FIG. 1, a system 100 for cognitive inferencing for large language models is described. In one or more embodiments, system 100 includes an integration layer 102. A "integration layer" as described in this disclosure is an interface that allows for communication between two subsystems. In one or more embodiments, integration layer 102 may serve middleware interface that facilitates the structured exchange of data, commands, or context between components that otherwise lack native compatibility or awareness of each other's internal workings. In one or more embodiments, integration layer 102 may perform a range of functions such as but not limited to data transformation, protocol translation, context injection, access control, authentication, routing, orchestration, caching and/or the like. In one or more embodiments, integration layer 102 might connect a static inference model with an external memory or logic engine, ensuring that dynamic context or behavioral constraints are accurately represented at runtime. In one or more embodiments, integration layer 102 may be modular, enabling it to operate independently of the core logic of the systems it connects. In one or more embodiments, integration layer 102 may serve as a governance point for enforcing security policies, data validation, and audit logging. In one or more embodiments, integration layer 102 may mediate access based on smart contracts, identity tokens, or zero-trust principles.

With continued reference to FIG. 1, in one or more embodiments, integration layer 102 may be configured to interface between a large language model and another system. In one or more embodiments, the other system may include a separate computing device, a database and/or the like. In one or more embodiments, integration layer 102 may operate as a runtime contextualization engine, assembling, filtering, formatting, and/or injecting relevant information into prompt structures that consumable by large language models. In one or more embodiments, integration layer 102 may serve as an interface between inputs received by a user and prompts transmitted to LLM. For example and without limitation, integration layer 102 may receive user inputs, modify the user inputs and transmit the modified user inputs to an LLM. In one or more embodiments, integration layer 102 may serve as a bridge between user inputs and prompts inputted into a large language model. In one or more embodiments, integration layer 102 may serve as a real-time interpreter and translator of cognitive memory, enabling adaptive contextualization without modifying the underlying model weights of an LLM. In one or more embodiments, integration layer 102 is communicatively connected to LLM. In one or more embodiments, integration layer 102 is communicatively connected to LLM wherein integration layer 102 may feed and/or input prompts into LLM. This will be described in further detail below.

With continued reference to FIG. 1, system 100 and/or integration layer 102 includes a computing device 104. System 100 and/or integration layer 102 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device 104. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register may be configured to synchronize the processor with other computing components. In one or more embodiments, processor 108 may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU may be configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently or may include two or more computing devices operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 and/or integration layer 102 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, system 100 and/or integration layer 102 may include and/or be communicatively connected to a database 116. Database may include a remote database. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. In one or more embodiments, database may include a remote database. A "remote database" as described in this disclosure is a is a database that is hosted on a server or computing system that is not located on the same physical machine as the client accessing it. Instead, it is accessed over a network, such as a local area network (LAN), a wide area network (WAN), or the internet. In one or more embodiments, computing device 104 may be communicatively connected to remote database, wherein computing device 104 may receive and/or transmit any data as described in this disclosure. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device. In one or more embodiments, computing device 104 may transmit processes to server wherein computing device 104 may conserve power or energy.

With continued reference to FIG. 1, processor 108 is configured to receive one or more user requests from a user. In one or more embodiments, processor 108 is configured to receive one or more user requests through integration layer 102. A "user" as described in this disclosure is an individual interacting with system. In one or more embodiments, user may include an individual seeking information from an LLM, an individual seeking to request information and/or the like. A "user request" as described in this disclosure is an input of information into system. In one or more embodiments, user requests may include any request to retrieve information from an LLM. In one or more embodiments, user requests may include any form of input, command, query, or interaction directed to a chatbot system or LLM. Such user requests may include natural language text prompts, structured queries, decision-making tasks, follow-up questions, clarifications, behavioral instructions, or task-specific directives. In one or more embodiments, user requests may include metadata such as timestamps, user identifiers, session tokens, interaction history references, privacy settings, domain constraints (e.g., legal, medical, educational) and/or the like. In one or more embodiments, user requests may include requests to modify information, analyze documents and/or the like.

With continued reference to FIG. 1, in one or more embodiments, user request 120 may include plain-text or natural language inputs. In one or more embodiments, user requests may further be received in a variety of structured or unstructured data formats. These formats can include, but are not limited to, PDF files, Word documents (e.g., .doc, .docx), plain text files (.txt), HTML content, spreadsheets (.xls, .xlsx), markdown (.md), JSON, XML, and other machine-readable or human-readable file types. In one or more embodiments, system 100 may include one or more parsing and preprocessing modules configured to extract relevant content, metadata, or semantic meaning from these documents, thereby transforming the input into a format suitable for interpretation by processor 108. For example, and without limitation, a user-submitted PDF containing case notes or legal documents may be processed to extract textual content, headings, timestamps, or contextual references, which can then be analyzed to generate new cognitive inference units (CI units 124) or update the agent's memory profile. Additionally, metadata embedded within the file (such as author, creation date, or embedded user identifiers).

Still referring to FIG. 1, in one or more embodiments, system 100 may be configured to perform optical character recognition in order to extract information from user requests. In some embodiments, optical character recognition or optical character reader (OCR) includes automatic conversion of images of written (e.g., typed, handwritten or printed text) into machine-encoded text. In one or more embodiments, recognition of at least a keyword from an image component may include one or more processes, including without limitation optical character recognition (OCR), optical word recognition, intelligent character recognition, intelligent word recognition, and the like. In one or more embodiments, OCR may recognize written text, one glyph or character at a time. In one or more embodiments, optical word recognition may recognize written text, one word at a time, for example, for languages that use a space as a word divider. In one or more embodiments, intelligent character recognition (ICR) may recognize written text one glyph or character at a time, for instance by employing machine learning processes. In one or more embodiments, intelligent word recognition (IWR) may recognize written text, one word at a time, for instance by employing machine learning processes.

Still referring to FIG. 1, in one or more embodiments OCR may be an "offline" process, which analyses a static document or image frame. In one or more embodiments, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In one or more embodiments, this technology may be referred to as "online" character recognition, dynamic character recognition, real-time character recognition, and intelligent character recognition.

Still referring to FIG. 1, in one or more embodiments, OCR processes may employ pre-processing of image component. Pre-processing process may include without limitation de-skew, de-speckle, binarization, line removal, layout analysis or "zoning," line and word detection, script recognition, character isolation or "segmentation," and normalization. In one or more embodiments, a de-skew process may include applying a transform (e.g., homography or affine transform) to image component to align text. In one or more embodiments, a de-speckle process may include removing positive and negative spots and/or smoothing edges. In one or more embodiments, a binarization process may include converting an image from color or greyscale to black-and-white (i.e., a binary image). Binarization may be performed as a simple way of separating text (or any other desired image component) from a background of image component. In one or more embodiments, binarization may be required for example if an employed OCR algorithm only works on binary images. In one or more embodiments, a line removal process may include removal of non-glyph or non-character imagery (e.g., boxes and lines). In one or more embodiments, a layout analysis or "zoning" process may identify columns, paragraphs, captions, and the like as distinct blocks. In one or more embodiments, a line and word detection process may establish a baseline for word and character shapes and separate words, if necessary. In one or more embodiments, a script recognition process may, for example in multilingual documents, identify script allowing an appropriate OCR algorithm to be selected. In one or more embodiments, a character isolation or "segmentation" process may separate signal characters, for example character-based OCR algorithms. In one or more embodiments, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In one or more embodiments, feature extraction may decompose a glyph into features. Exemplary non-limiting features may include corners, edges, lines, closed loops, line direction, line intersections, and the like. In one or more embodiments, feature extraction may reduce dimensionality of representation and may make the recognition process computationally more efficient. In one or more embodiments, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 6-8. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in one or more embodiments, OCR may employ a two-pass approach to character recognition. Second pass may include adaptive recognition and use letter shapes recognized with high confidence on a first pass to recognize better remaining letters on the second pass. In one or more embodiments, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In one or more embodiments, OCR software may employ neural networks, for example neural networks as taught in reference to FIGS. 6-8.

Still referring to FIG. 1, in one or more embodiments, OCR may include post-processing. For example, OCR accuracy can be increased, in one or more embodiments, if output is constrained by a lexicon. A lexicon may include a list or set of words that are allowed to occur in a document. In one or more embodiments, a lexicon may include, for instance, all the words in the English language, or a more technical lexicon for a specific field. In one or more embodiments, an output stream may be a plain text stream or file of characters.

In one or more embodiments, an OCR process may preserve an original layout of visual verbal content. In one or more embodiments, near-neighbor analysis can make use of co-occurrence frequencies to correct errors, by noting that certain words are often seen together. For example, "Washington, D.C." is generally far more common in English than "Washington DOC." In one or more embodiments, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in one or more embodiments, user request 120 includes a user interaction with LLM. A "user interaction" as described in this disclosure refers to any communication between a user and a system. In one or more embodiments, user interaction may include communication between a user and LLM such as but not limited to issuing questions, responding to follow-up prompts, providing feedback, selecting from generated options, correcting previous outputs, or guiding the LLM toward a preferred reasoning path. In one or more embodiments, user interactions may occur in real time or asynchronously and may span multiple sessions or platforms. In one or more embodiments, system 100 may be configured to interpret such user interactions as user requests.

With continued reference to FIG. 1, in one or more embodiments system 100 may be configured to receive user requests 120. In one or more embodiments, receiving user requests 120 may include receiving a user identifier 128 associated with one or more user requests. A "user identifier" as described in this disclosure a unique data element associated with an individual user, used to identify the individual user. For example, and without limitation, user identifier 128 may include a username and password, a unique alphanumeric sequence associated with the user, a finger scan, a retinal scan, a pin code and/or the like. In one or more embodiments, user identifier 128 may be derived or assigned in multiple ways, including but not limited to: (i) explicit user input such as a username, email address, account ID, or cryptographic key; (ii) device-level information such as IP address, MAC address, browser fingerprint, or mobile device identifier; and (iii) contextual metadata embedded within or inferred from the user request 120 itself, such as prior conversational history, writing style, language preference, session tokens, or embedded tags. In one or more embodiments, user identifier 128 may be associated with authentication mechanisms, including biometric data (e.g., fingerprint, facial recognition), OAuth tokens, secure logins, or blockchain-bound smart contracts that verify user identity. In one or more embodiments, user identifier 128 may be used to inform system 100 of a particular user interacting with system 100. In one or more embodiments, user identifier 128 may be used to associate user requests with a specific individual. In one or more embodiments, user identifier 128 may be used to aggregate and/or store all user requests associated with an individual user. This will be described in further detail below.

With continued reference to FIG. 1, user requests may include communications with an LLM. A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documentation, inventory documentation, emails, user communications, advertising documents, newspaper articles, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on the capability needed such as generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In one or more embodiments, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet," then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you," with "how" and "are." It's also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device 104 that is used by a user. As non-limiting examples, user device may include desktops, laptops, smartphones, tablets, and the like. In some embodiments, input may include any set of data associated with [specific example].

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, integration layer 102 is community connected to LLM, wherein integration layer 102 may transmit user requests and any other supporting information to LLM. In one or more embodiments, integration layer 102 may be communicatively connected to LLM, wherein integration layer 102 may input prompts into LLM and receive responses. In one or more embodiments, responses may then be transmitted to user.

With continued reference to FIG. 1, LLM includes a static LLM 106. A "static LLM" as described in this disclosure is a large language model that does not recall or reference previous conversations or user interactions beyond the current input received. In one or more embodiments, a static LLM 106 may generate responses based solely on the information encoded in their pretrained architecture and whatever contextual input (e.g., prompts) is supplied at runtime. In one or more embodiments, a static LLM 106 may be designed for inference-only operation, meaning that it can interpret and respond to prompts using existing knowledge. In one or more embodiments, a static LLM 106 may be trained with new corpus of data, however the static LLM 106 may not be trained and/or fine-tuned to a specific individual. In one or more embodiments, a static LLM 106 may be trained with new information or a new corpus of data that can be referred to but lack training or fine-tuning with respect to a specific user. In one or more embodiments, a static LLM 106 may not internally learn from new interactions without undergoing a formal retraining or fine-tuning process on external infrastructure. In contrast, a dynamic LLM may refer to a model architecture that continuously updates its parameters in response to previous user interactions. In one or more embodiments, a dynamic LLM may incorporate mechanisms such as online learning, reinforcement learning from human feedback (RLHF), or self-supervised updates, allowing the dynamic LLM to evolve over time and modify its behavior without full retraining. This capability allows dynamic LLMs to "remember" users and thus remember new facts, shift tone, improve task performance, or adapt to individual users in real time. In one or more embodiments, static LLM 106 may lack a local memory used to "remember" previous interactions with the same or similar users. In one or more embodiments, static LLM 106 may include an LLM capable of storing conversations in local memory yet be configured not to store conversation for subsequent interactions. Specifically, a static LLM 106 may not retain or persist any information between user interactions unless such information is explicitly reintroduced through a contextual input at runtime. In one or more embodiments, a static LLM 106 is configured not to recall prior conversations, user-specific data, or historical reasoning paths across multiple sessions.

With continued reference to FIG. 1, user request 120 may be received from a device such as a laptop, desktop computer and/or the like. In one or more embodiments, user request 120 may be received by any computing device 104 or system that may be communicatively connected to system 100. In one or more embodiments, user request 120 may be received by or through a chatbot system. A "chatbot system" for the purposes of this disclosure is a program configured to simulate human interaction with a user in order to receive or convey information. In one or more embodiments, chatbot system may be configured to simulate human-like interactions with user in order to receive, interpret, and convey information to or from an underlying large language model (LLM). In one or more embodiments, chatbot system may be configured to present and receive information in a natural language format, enabling bi-directional communication between the user and the LLM in a human-centric and conversational manner. In one or more embodiments, chatbot system may present interactive queries or prompts to the user that are aligned with additional information needed by the LLM to generate a relevant and context-aware response. These prompts may be generated dynamically based on prior user interactions recorded in the CI log 148. In one or more embodiments, chatbot system may be configured to receive user inputs in natural language form and optionally convert these inputs into structured representations. In one or more embodiments, the chatbot system may include passive data monitoring capabilities. For example, the chatbot system may record user behaviors such as reaction times, word choices, or linguistic patterns which may be used to generate CI units 124 as described in further detail below. In one or more embodiments, interactions may occur implicitly or explicitly and contribute to a profile associated with user. In one or more embodiments, chatbot system may be instantiated through a graphical user interface (GUI), which may be rendered on a remote or local device. In one or more embodiments, the GUI may include interactive elements such as text boxes, chat windows, input fields, icons, or avatars that facilitate user engagement. In one or more embodiments, chatbot system may serve as an intermediary layer that bridges user requests to the LLM using Ledger integration layer 102. Communications routed through chatbot system may be processed ultimately transmitted to LLM. The LLM's responses may be delivered back to the user through the same chatbot interface, thereby maintaining a conversational flow.

With continued reference to FIG. 1, processor 108 is configured to generate one or more cognitive inference units from the one or more user requests. A "Cognitive inference (CI) unit" as described in this disclosure is a piece of information which captures knowledge, reasoning or context associated with a user request 120. For example, and without limitation CI unit 124 may include a piece of information such as "the user is a male," the "user is allergic to peanuts," and/or the like. In one or more embodiments, each CI unit 124 may serve as a self-contained representation of a cognitive element that can be stored, recalled, validated, or referenced to enable continuity and transparency in a static LLM 106. In one or more embodiments, a CI unit 124 may be automatically generated, extracted, and/or synthesized based on user requests and may be formatted in a machine-readable structure suitable for ledgering, validation and/or any other processes as described below. In one or more embodiments, CI units 124 may be categorized into several types, each serving a distinct function within a broader cognitive framework. In one or more embodiments, CI unit 124 may include a factual unit. A factual unit may represent a concrete, verifiable statement or data point extracted from a user input or AI response, such as a report of a medical symptom or a biographical fact. For example, the factual unit may take the form of a statement such as, "The user is 45 years old and resides in California," derived directly from user input. In one or more embodiments, CI unit 124 may include an intent unit. An intent unit may encode an underlying goal or objective expressed or implied by the user, such as a desire to receive advice or complete a task. For example, the intent unit may reflect a goal like, "User is seeking financial planning advice," indicating the purpose of the engagement. In one or more embodiments, CI unit 124 may include a preference unit. A preference unit may capture stated or inferred user-specific behaviors, such as formatting styles, tone preferences, or communication modes. For example, a preference unit might state, "User prefers visual summaries with charts instead of plain text," capturing stylistic or delivery choices of the user. In one or more embodiments, CI unit 124 may include a behavioral unit. A behavioral unit may log patterns of user responses, such as for example, when an empathetic tone or formal register was used in prior conversations. For example, a behavioral unit may log, "user adopted a conciliatory tone when responding to emotional distress," documenting how the user may behave specific context. In one or more embodiments, CI unit 124 may include a clarification unit. A clarification unit may record disambiguation or refinements applied to ambiguous input, ensuring accurate interpretation of user intent or terminology. For example, a clarification unit might resolve ambiguity with a record such as, "User's reference to 'ADA' confirmed to mean Americans with Disabilities Act, not average daily attendance," thereby enhancing interpretability. In one or more embodiments, CI units 124 may further include inferred reasoning units or hypothetical user-state units that encapsulate provisional assumptions, interpretations, or conclusions drawn by system 100 based on incomplete, indirect, or contextual signals present in the user request 120 or interaction history. Such units may not be directly confirmed by explicit user input but may rather be generated through natural language inference, pattern recognition, behavioral heuristics, or statistical likelihood estimation. For example, system 100 may infer from repeated queries about anxiety medications that the user is experiencing mental health concerns, generating a CI unit 124 such as "Hypothesis: User may be seeking anxiety treatment options." These inference-based units may be tagged as provisional and require future validation. In one or more embodiments, CI units 124 may include hypothesis made about the individual, basic facts extracted from user requests and/or the like.

With continued reference to FIG. 1, CI unit 124 may include a continuity datum. A "continuity datum," as described in this disclosure refers to information that preserves conversational or cognitive continuity across multiple user sessions. In one or more embodiments, continuity datum may be configured to provide a static LLM 106 with contextual reference points regarding prior interactions, enabling the generation of responses that appear coherent, ongoing, and consistent with historical exchanges. In one or more embodiments, continuity datum may include, but is not limited to: (i) a session summary derived from one or more previous user requests or responses; (ii) one or more identifiers pointing to prior CI units 124; (iii) timestamps or chronological markers that indicate when certain CI units 124 were created or referenced; (iv) state variables representing the emotional, task-based, or relational status of the interaction; and (v) context cues such as the last known goal, user concern, or unresolved question. In one or more embodiments, continuity datum may include relevant pieces of information from a prior session that would provide context to subsequent user requests made by user. In a non-limiting example, A patient may re-engage with a therapeutic agent, wherein system 100 may load the prior CI state using continuity datum to preserve tone and affect to resume from the previous conversation. In another non-limiting example, a user may continue estate planning with an agent suitable configured for estate planning. The system resumes from the prior checkpoint where legal options were last discussed using the continuity datum.

With continued reference to FIG. 1, in one or more embodiments, a CI trail checkpoint may be established during a user-agent interaction, wherein the user is actively engaging with system 100 and generating CI units 124 through dialogue, actions, or other input mechanisms. A "CI trail" as described in this disclosure refers to a temporally or thematically linked sequence of CI units. In one or more embodiments, CI trail may include CI units generated in sequence during a user-agent interaction, wherein the user is interacting with system. A "CI trail checkpoint" as described in this disclosure refers to a designated position that marks a restorable state of the interaction suitable for future resumption. In one or more embodiments, each CI trail checkpoint may include a temporally or thematically linked sequence of CI units 124 that have been generated during a user-agent interaction, wherein a user may continue an interaction from the last generated CI unit. In one or more embodiments, a CI trail checkpoint may be created either automatically by the system or manually triggered based on user behavior, agent logic, or predefined simulation rules. In one or more embodiments, Each CI trail checkpoint may be associated with metadata including a unique identifier, agent ID, session timestamp, and corresponding continuity datum, which enables system 100 to reconstruct the simulation or dialogue environment in a manner that is coherent with the interaction history. A CI trail checkpoint may reflect a meaningful interaction state, such as: (i) the resolution of a decision point within a branching scenario (e.g., choosing among treatment options in a clinical simulation); (ii) the conclusion of a task subroutine (e.g., completing a financial intake form in an estate planning session); (iii) the issuance of a synthesized recommendation, summary, or system-generated insight (e.g., an agent delivering a diagnosis hypothesis or legal strategy preview); or (iv) a rule-triggered transition, such as an escalation to a specialized agent, initiation of an audit log, or ethical boundary evaluation by the Socratic engine 132. In one or more embodiments, CI trail checkpoints may be established during active interaction between user and system (or static LLM) and may be directly informed by real-time user inputs and agent outputs, ensuring fidelity to the actual conversational or procedural flow. When combined with a simulation continuity flag, the checkpoint enables seamless reentry into the prior simulation state, preserving user progress, agent memory, and contextual integrity across sessions. In one or more embodiments, checkpoints may be indexed for later retrieval, filtered by user or agent identity, and visually rendered using SmartDoc rendering logic within ab interface layer. In one or more embodiments, A CI unit may include a simulation continuity flag configured to enable reentry into a prior CI trail checkpoint associated with a previous user-agent interaction.

With continued reference to FIG. 1, CI unit 124 may include a simulation continuity flag, which is configured to signal that the CI unit serves as a reentry point into a prior simulation or user-agent interaction thread. A "simulation continuity flag" as described in this disclosure refers to information that designates a CI unit as a restorable anchor for use in continuation of a previous user and system interaction. In one or more embodiments, the simulation continuity flag may reference or embed a corresponding CI trail checkpoint, enabling system 100 to resume a paused or terminated simulation from that exact position. In one or more embodiments, simulation continuity flag may point to a checkpoint identifier or may directly encapsulate the relevant state data, including references to continuity datum, session metadata, agent state variables, and any unresolved decision branches or goals. In one or more embodiments, the presence of a simulation continuity flag within a CI unit may signal to system 100 that the unit is eligible for session resumption logic and may be selected during session reentry processes (such as when a user reconnects with a fiduciary agent, resumes a workflow, or requests to "pick up where they left off." In such cases, the system may scan CI log 148 for the most recent or contextually appropriate CI unit 124 marked with a simulation continuity flag, retrieve its associated checkpoint, and rehydrate the relevant simulation state accordingly. This mechanism ensures that the resumed interaction remains temporally and cognitively aligned with the user's historical engagement. In one or more embodiments, CI unit may include a simulation continuity flag configured to enable reentry into a prior CI trail checkpoint associated with a previous user-agent interaction.

With continued reference to FIG. 1, in one or more embodiments, system 100 may further include a SmartDoc and simulation reentry layer, which functions as a documentation module configured to govern the agent's ability to re-enter paused or previously terminated simulation scenes. As used herein, the "SmartDoc and simulation reentry layer" refers to a subsystem within system or an interface layer that is responsible for managing simulation continuity, state hydration, and checkpoint-based resumption. In one or more embodiments, reentry layer may achieve this by referencing CI units 124 that include simulation continuity flags and corresponding CI trail checkpoints. In one or more embodiments, this layer may be invoked during session reentry processes, such as when a user reconnects with a fiduciary agent or requests to resume a task-specific or narrative simulation from a known historical point. The SmartDoc and simulation reentry layer may coordinate retrieval of the relevant CI unit 124, load associated continuity datum, and reinitialize both agent context and interface state, ensuring cognitive and procedural alignment with the paused scene. In one or more embodiments, this reentry layer may be critical in therapeutic and forensic use case models, where precision in simulation state restoration, memory consistency, and interaction integrity are essential. In the therapeutic domain, it may allow a virtual counselor or behavioral health agent to resume a session with accurate recall of a user's emotional state, therapeutic goals, or prior disclosures. In the forensic context, it may facilitate detailed reconstruction of simulation-based evaluations, decision logs, or evidence-related narratives for legal, compliance, or audit review. In one or more embodiments, the SmartDoc and simulation reentry layer may operate in conjunction with, or be integrated into, other system components previously described in this disclosure including the interface layer, simulation rendering interface, Socratic engine 132, and ledger integration layer 102. It may leverage SmartDoc rendering logic to visually recreate paused simulation scenes, and may apply role-specific behavioral scopes, audit-linked continuity constraints, or agent profile data when reconstructing simulation environments. In this way, the reentry layer enables structured, governed, and traceable simulation continuity across diverse domains, while supporting the ethical, therapeutic, and evidentiary requirements of high-integrity user-agent interactions.

With continued reference to FIG. 1, in one or more embodiments, the SmartDoc and simulation reentry layer may be configured to link to prior CI trails (as described in reference to at least FIG. 4 as well) for the purpose of simulation resumption, reasoning continuity, or governed rehydration of a paused interaction thread. In one or more embodiments, CI trail may include sequence of thematically or temporally linked CI units 124 that collectively represent a persistent record of a user-agent interaction over time. In one or more embodiments, the simulation reentry layer may utilize the presence of a simulation continuity flag within a CI unit 124 to locate a corresponding CI trail checkpoint, enabling the system to identify a precise position within the prior trail from which simulation may be resumed. Upon reentry, the system may access continuity datum, reconstruct the agent's prior cognitive state, and restore relevant simulation variables, thereby aligning the ongoing interaction with the user's historical trajectory. In one or more embodiments, simulation reentry layer may integrate directly with the simulation loop described therein. If the simulation has not ended, and the system is configured to continue with updated context or new user input, the reentry layer may act as a gatekeeper that ensures the resumed interaction begins from a verified and auditable point within a prior CI trail. This linkage may involve querying CI log 148 for the most recent simulation continuity flag tied to a given user and agent identifier pair, validating that the associated CI unit 124 satisfies ethical, memory, and compliance conditions, and initializing the simulation environment accordingly. In one or more embodiments, reentry into a CI trail checkpoint may also restore simulation state variables such as emotional tone, narrative objective, prior user concerns, or unresolved logic branches that were suspended at the time of the pause. In one or more embodiments, this functionality may allow for seamless transitions across sessions, devices, or even agent roles, provided that continuity and audit conditions are satisfied. For example, a legal scenario paused at a decision node related to estate division may be resumed days later with full access to prior rationale and agent commentary, while a therapeutic dialogue interrupted mid-intervention may be reloaded with affective markers and memory continuity intact. The SmartDoc and simulation reentry layer ensures that such resumption is not only contextually coherent but also traceable and bounded, thereby supporting its critical role in both real-time interaction management and post hoc review processes within system 100.

With continued reference to FIG. 1, in one more embodiments, CI unit 124 may include an agent profile. An "agent profile" as described in this disclosure is a structured presentation that assigns an identity to an LLM. For example, and without limitation, agent profile may indicate that the a user has made a request that the LLM respond as if the LLM were an attorney or medical professional. In one or more embodiments, agent profile may include an attorney, a medical professional, a tax accountant, a spouse, a friend, and/or the like. In one or more embodiments, agent profile may define in what context outputs of the LLM should be created. For example, and without limitation, an agent profile of medical professional may indicate that all LLM output are generated in the context of a medical professional conveying information. In one or more embodiments, an agent profile may server as a structured data that defines the behavioral, functional, and communicative parameters to be followed by an LLM user interaction. In one or more embodiments, the agent profile may serve as a directive layer that commands or configures the LLM to simulate responses as though it were acting in the capacity of a particular type of individual or professional. In one or more embodiments, agent profile may include a care provider such as a medical professional. In one or more embodiments, a care provider may include an individual that holds themselves out as being proficient in medicine or behavioral health. In one or more embodiments, the agent profile may specify a care provider wherein such designation may include individuals licensed to practice medicine, such as physicians, nurse practitioners, or clinical specialists. In one or more embodiments, care provider may include a clinical psychiatrist, in which case the LLM is configured to engage the user using clinical viewing techniques, therapeutic questioning patterns, or other protocols common in psychiatric evaluation. Additionally or alternatively, agent profile may include attributes that instruct the LLM to simulate empathetic communication, adopt a specific dialect or vernacular, or conduct interactions in a selected natural language. In one or more embodiments, the agent profile may also indicate ethical boundaries, response constraints, or legal disclaimers that the LLM must observe during the conversation. In one or more embodiments, agent profiles may be identified within user requests. In one or more embodiments, agent profiles may be explicitly requested by the user, such as for example, "I would like the LLM to behave as a clinical psychologist." In one or more embodiments, Agent profile may be inferred based on user requests. For example, user request 120 may include requests to seek medical evaluation or request to receive a diagnoses. In one or more embodiments, agent profile may define a role for an LLM such as a static LLM 106. In one or more embodiments, defining a role may include requesting LLM to behave and/or act similar to that of information contained within agent profile. In one or more embodiments, agent profile may be stored in a ledger or log such as CI log 148 as described in further detail below. In one or more embodiments, agent profile may be iteratively updated upon subsequent user interactions. In one or more embodiments, agent profile may include multiple user requests that have indicated a preference when communicating with LLM. For example, and without limitation, in a first user interaction, user request 120 may indicate or infer that the LLM to be sympathetic, wherein agent profile may contain information to request LLM to be sympathetic. Additionally, in a second user interaction, a second user request 120 may indicate or infer that the LLM act as a care provider, wherein agent profile may further include care provider in addition to sympathetic.

With continued reference to FIG. 1, in one or more embodiments, agent profile may further include structured configurations that designate the agent as acting in a clinical intake and assessment capacity or as a financial forecasting and budgeting advisor, each with associated behavioral parameters, ethical boundaries, and continuity logic. In one or more embodiments, when configured for clinical intake and assessment, the agent profile may define a role in which the agent is expected to conduct structured intake interviews, collect behavioral or symptomatic data, apply standardized screening logic, and simulate responses aligned with psychiatric, psychological, or general medical evaluation procedures. The profile may include protocols for affective observation, diagnostic inquiry, trauma-informed questioning, or DSM-compatible pattern recognition. In such embodiments, the agent may also reference or incorporate recognized care pathways, therapeutic frameworks, and intake templates, and be bound by simulated compliance with informed consent principles and scope-of-practice limitations. In one or more embodiments, the agent profile may instead or additionally configure the agent to simulate a financial forecasting and budgeting advisor, wherein agent behavior is scoped to include income modeling, expense categorization, risk factor analysis, savings projection, retirement modeling, and credit or debt management strategies. The profile may include embedded heuristics, rule-based forecasting models, macroeconomic context adjustments, and temporal planning logic (e.g., fiscal year vs. rolling forecast). The agent may be bound to maintain consistency across forecasted scenarios, respect conservative reporting constraints, and track budget iterations over time for continuity and user accountability. Outputs may include balance sheets, forecast variance analyses, or simulation-driven decision trees for budget planning under uncertainty. In one or more embodiments, ethical boundaries, role-based scopes, and continuity principles associated with these agent profiles may be enforced through policy-driven constraints embedded in the agent profile and validated by modules such as the Socratic engine 132 or governance layers. For example, a clinical intake agent may be restricted from delivering formal diagnoses or treatment recommendations unless certain threshold conditions or disclaimers are met and may instead escalate to a licensed provider profile. Similarly, financial agents may be constrained from offering tax or legal advice unless authorized by a verified fiduciary agent profile. These agents may additionally operate within a compliance ecosystem modeled on principles of AI ethics frameworks or legal or ethical guidelines. Under this paradigm, all agent decisions and actions may be logged immutably via blockchain-backed audit trails, with periodic or real-time review processes. For example, in one or more embodiments, all user-agent interactions within these scopes may be tagged with provenance metadata and logged in CI log 148 for quarterly review by an oversight system. These reviews may assess whether the agent upheld its designated ethical posture, remained within its professional simulation boundary, and maintained accurate and context-consistent memory continuity. In this way, agent profiles not only configure interaction behavior but also serve as compliance anchors that support long-term trust, role integrity, and system auditability.

With continued reference to FIG. 1, system 100 may perform an inference extraction process in order to extract CI units 124. An "inference extraction process" as described in this disclosure is a process in which CI units 124 are extracted or inferred from user requests. In one or more embodiments, the inference extraction process may include a process that transforms unstructured or semi-structured user requests into CI units 124. In one or more embodiments, inference extraction process may be implemented as part of or in coordination with the chatbot system, the integration layer 102, and the static LLM 106, and may involve both real-time and asynchronous operations. In one or more embodiments, inference extraction process may include semantic parsing and intent recognition of user requests. In one or more embodiments, during semantic parsing and intent recognition, user requests are analyzed using language models (e.g., such as by using transformer-based static LLMs) to identify actionable intent, domain-specific entities, temporal references, causal relationships and/or the like. For example, system 100 may determine that the user is expressing a goal (e.g., "I want to reduce my anxiety"), sharing a status update (e.g., "I didn't sleep well last night"), or disclosing a preference or aversion (e.g., "I don't like taking medication"). These interpretations may be then structured as CI units 124. In one or more embodiments, processor 108 may evaluate whether the extracted meaning meets thresholds for coherence, completeness, and confidence. This may involve context-matching against existing CI units 124 stored in the CI log 148, using a memory-matching algorithm or embedding similarity search to avoid duplication and ensure continuity. Each resulting CI unit 124 may be assigned a type classification, such as Factual (e.g., "User reports a headache"), intent-based (e.g., "User wants to book a therapy session"), Behavioral (e.g., "User engages late at night"), Relational (e.g., "User trusts Agent X over Agent Y"), Hypothetical/Inferential (e.g., "User may be experiencing chronic fatigue"), Temporal/Sequential (e.g., "User discussed Topic A before Topic B") and/or the like.

With continued reference to FIG. 1, in one or more embodiments, an LLM (separate from that of static LLM 106) may be configured to receive incoming user requests and interactions to identify latent meanings, recurring patterns, relationships, or propositions that can be abstracted into discrete inferential elements and used to CI units 124. In one or more embodiments, the LLM may be configured to parse and analyze user input to identify semantic propositions, intent statements, or goal-driven directives. Additionally or alternatively, the LLM may be configured to detect temporal, causal, or relational structures in user statements (e.g., "I prefer working late"—time-based preference inference). Additionally or alternatively, LLM may be configured to infer user emotional states, cognitive biases, or habitual behaviors based on repeated interactions. Additionally or alternatively LLM may be configured to generate summarized logical abstractions from longer conversations, which are then encoded as CI units 124 for later use. Additionally or alternatively LLM may be configured to convert free-form dialogue or structured input into standardized CI formats using predefined schemas (e.g., subject-predicate-object). In one or more embodiments, CI units 124 may be categorized into various types (e.g., preference CI units 124, factual assertion CI units 124, goal CI units 124, agent identity CI units 124, hypothesis CI units 124), each with distinct schemas for capturing and storing data.

With continued reference to FIG. 1, in one or more embodiments, CI units 124 may also be extracted through mechanisms that operate independently of or in parallel to the LLM. In one or more embodiments, CI units 124 may be extracted using rule-based engines. In one or more embodiments, a rule-based inference engine may be configured to scan user input for specific linguistic or syntactic patterns. In one or more embodiments, rule-based inference engines may operate by matching user input against a library of linguistic, syntactic, or semantic patterns. These patterns may be encoded as conditional logic statements (e.g., IF-THEN rules) that define what constitutes an inference-worthy statement or structure. When a match is detected, the engine may extracts specific elements from the input. In one or more embodiments, the engine may extract a subject, predicate, and object and encode them as a structured CI unit 124. For example, a rule may include that of the input contains phrases like "I prefer", "I usually", or "I like to", then extract a preference CI unit 124 (e.g., input: "I usually work best at night"→CI unit 124: {Type: Preference, Content: Works best at night}). Similarly, if the input includes modal verbs like "want to", "need to", or "plan to", then extract a goal CI unit 124 (e.g., input: "I want to finish my degree next year"→CI unit 124: {Type: Goal, Content: Finish degree, Timeframe: Next year}). In one or more embodiments, rule sets may be configured to operate independently or in parallel with an LLM. In one or more embodiments, rule-based engines may also include domain-specific templates (such as legal, medical, or educational phrase patterns) designed to extract domain-relevant inferences with high precision.

With continued reference to FIG. 1, in one or more embodiments, processor 108 may use a machine learning model such as any machine learning model as described in this disclosure to receive as an input user requests and output one or more CI units 124. Processor 108 may use a machine learning model such as any machine learning model as described in this disclosure to generate CI units 124. In one or more embodiments, processor 108 may use a machine learning module to implement one or more algorithms or generate one or more machine learning models, such as an extraction machine learning model. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In a further embodiment, training data may include previous outputs such that one or more machine learning models iteratively produces outputs.

With continued reference to FIG. 1, a machine learning model such as an extraction machine learning model may be configured to receive user requests as an input and output CI units 124. In one or more embodiments, extraction machine learning model may be trained using a labeled dataset that includes pairs of user requests and annotated CI units 124, each classified according to CI unit 124 types (e.g., preference, goal, hypothesis, behavior, agent profile, affective state, and others). In one or more embodiments, the training data may be derived from conversational transcripts, historical chatbot interactions, synthetic user prompts, domain-specific corpora (e.g., clinical dialogue, legal documents, customer service chat logs), and curated examples annotated by human experts. Such annotations may include not only the inferred content but also metadata describing the context, confidence, intent, and temporal indicators associated with the CI unit 124. In one or more embodiments, extraction machine learning model may include one or more supervised learning architectures, including but not limited to transformer-based encoders, recurrent neural networks (RNNs), or convolutional neural networks (CNNs), each configured to identify semantically meaningful segments of user input. In one or more embodiments, extraction machine learning model may include a classification head configured to determine the most likely CI unit 124 type based on the latent representation of the input, and a sequence extraction head configured to generate the specific textual or symbolic content to be included in the CI unit 124. In one or more embodiments, extraction machine learning model may first tokenize or embed the user request 120 into a feature space using one or more natural language processing (NLP) techniques such as word embeddings, attention layers, or positional encodings. A classification layer may then predict the type of CI unit 124 present in the input, while a span extraction layer or pointer network may extract the content relevant to that type. For example, a user input such as "I want to change careers in the next six months" may be classified as a "Goal" type CI unit 124, and the extracted content may include the inferred goal ("change careers") and associated timeframe ("next six months"). In one or more embodiments, extraction machine learning model may be trained using cross-entropy loss on classification labels and token span loss or sequence-level loss on content extraction, with optional regularization to encourage sparsity or temporal coherence across sequential user requests. Additionally or alternatively, the training process may include fine-tuning on domain-specific data or continual learning mechanisms to improve accuracy over time. In one or more embodiments, processor 108 may be configured to feed user request 120 into extraction machine learning model as part of inference exaction process and receive as an output one or more CI units 124.

With continued reference to FIG. 1, processor 108 is configured to assign a confidence-falsifiability (CF) delta for each of the one or more CI units 124 using a Socratic engine 132. A "confidence-falsifiability (CF) delta" as described in this disclosure is a quantified metric that express a confidence level of a generated piece of information and a degree to which the piece of information is falsifiable based on available or anticipated evidence. For example, and without limitation, CF delta 136 may indicate how accurate a generated CI unit 124 is and to what degree the CI unit 124 may be falsifiable. In one or more embodiments, CF delta 136 may include a confidence scores associated with a CI unit 124. In one or more embodiments, the confidence score may include a numerical or categorical value representing a likelihood that the CI unit 124 reflects a valid, coherent, or factually grounded inference. In one or more embodiments, CF delta 136 may include a falsifiability index. In one or more embodiments, the fallibility index may include a value or flag that designates how empirically testable or logically challengeable the CI unit 124 is. In one or more embodiments, CI units 124 that are based on assumptions, inferred intentions, or hypothetical scenarios may be marked with a high falsifiability score, while CI units 124 derived from explicit, verifiable user statements may be marked as low in falsifiability. In one or more embodiments, CF delta 136 may include a validation state. In one or more embodiments, a validation state may include metadata indicating whether the CI unit 124 has been subsequently confirmed, contradicted, or remains unvalidated. This may include status tags such as "provisionally accepted," "awaiting validation," "refuted," or "reinforced." In one or more embodiments, CF delta 136 may include a source confidence, wherein the course confidence includes data indicating the origin and quality of the source from which the inference was made. For example and without limitation, source confidence may include direct user statement, behavioral cue, third-party data, or extrapolation. In one or more embodiments, CF delta 136 may include temporal certainty, wherein temporal certainty may include a time-linked decay function or timestamp weighting indicating whether confidence in the inference should diminish or increase with time or based on new data. In one or more embodiments, each generated or extracted CI unit 124 may receive an assigned CF delta 136.

With continued reference to FIG. 1, CF delta 136 is generated using a Socratic engine 132. A "Socratic engine" as described in this disclosure is a subsystem or module configured to evaluate CI units 124. In one or more embodiments, Socratic engine 132 may be configured to apply principles of logical consistency, empirical validation, and epistemic scrutiny in order to evaluate CI units 124. In one or more embodiments, Socratic engine 132 may operate as a falsifiability-oriented reasoning module that ensures that CI units 124 are accurate. In one or more embodiments, Socratic engine 132 may be configured to compare newly generated CI units 124 against stored inference units 140 located in local memory and/or stored in database. A "stored inference unit" as described in this disclosure is a CI unit 124 that was generated prior to receipt of user request 120 by system 100. In one or more embodiments, stored inference unit 140 may include CI units 124 generated on a previous day, previous hour, previous iteration of a processing of system and/or the like. In one or more embodiments, stored inference units 140 may be generated from user requests associated with previous iterations of a processing of system. For example, and without limitation, stored inference units 140 may include CI units 124 that were generated on a previous day to a previous receipt of user request 120. In one or more embodiments, stored inference units 140 may be stored in local memory on a database and/or in a ledger or log as described in further detail below. In one or more embodiments, socratic engine 132 may be configured to retrieve stored inference units 140 and detect logical contradictions, redundancies, or inconsistencies between CI units 124 and stored inference units 140. If an inconsistency is detected, socratic engine 132 may flag the CI unit 124, lower its CF delta 136, or generate a new CI unit 124 to represent a contradiction or an updated hypothesis. In one or more embodiments, socratic engine 132 may be configured to compare CI against one another to identify one or more logical inconsistencies. For example and without limitation, a first CI unit 124 may indicate the user is 40 years old and the second CI unit 124 may indicate that the user is 16 years old. In one or more embodiments, socratic engine 132 may then determine that a confidence level associated with age is low due to contradictions. In one or more embodiments, socratic engine 132 may be configured to determine whether a CI unit 124 is empirically or logically falsifiable. This may involve checking whether sufficient data exists (or could feasibly be obtained) to test the claim. In one or more embodiments, socratic engine 132 may score CI units 124 along a falsifiability index that contributes to the CF delta 136. In one or more embodiments, socratic engine 132 may be configured to generate follow-up prompts, behavioral tests, or monitoring tasks designed to validate high-priority or high-uncertainty CI units 124. These prompts may be directed to the user, to system monitoring tools, or to third-party data sources. In one or more embodiments, based on incoming data or new user interactions, the Socratic engine 132 may adjust the CF delta 136 of existing CI units 124 by increasing or decreasing their confidence score or falsifiability index.

With continued reference to FIG. 1, CI units 124 may be compared to stored inference units in order to identify a confidence level of each CI unit. In one or more embodiments, which cognitive inference (CI) units are compared to previously stored inference units in order to determine a confidence level associated with each new or incoming CI unit. A "confidence level" as described in this disclosure refers to a quantified representation in the accuracy or validity of a given CI unit. In one or more embodiments, the confidence level may be expressed as a scalar value, probability, categorical label (e.g., high, medium, low), or a weighted score, and may be used as a foundational component in determining the CI unit's associated confidence-falsifiability delta (CF delta). In one or more embodiments, system and Socratic engine may determine and/or identify a confidence level of a CI unit 124 by analyzing its semantic or logical consistency with one or more stored inference units that are previously appended to the CI log. The comparison may involve evaluating whether the new CI unit 124 directly contradicts, overlaps with, or supports any stored inference units. Logical contradiction may include opposite claims, mutually exclusive assertions, or irreconcilable differences in reasoning chains. If such inconsistencies are identified, the confidence level of the new CI unit 124 may be reduced accordingly to reflect a lower degree of certainty or a higher risk of falsifiability. Additionally or alternatively, in one or more embodiments, if the CI unit 124 is found to align with, reinforce, or be supported by existing stored inference units, the confidence level may be elevated. This may occur when the new CI unit 124 mirrors prior conclusions, builds upon previously validated reasoning, or introduces corroborating context that strengthens earlier inferences. Support may be identified through exact matches, semantic similarity, or inferred thematic alignment using machine learning classifiers, rule-based logic, or statistical correlation. In one or more embodiments, socratic engine 132 may compare the newly received CI unit to the stored inference units by initiating a query or traversal of the CI log. The comparison may involve embedding-based similarity scoring, symbolic logic tests, or domain-specific rule sets designed to detect alignment or contradiction between inferences. In one or more embodiments, Socratic engine 132 may assign a preliminary confidence score to the new CI unit 124 based on the outcome of this comparison. For example, the presence of two or more supporting CI units within the log may increase the confidence level of the new CI unit, while detection of a directly conflicting inference with a high CF delta may decrease it. Once the confidence level is established, it may be used either directly or in conjunction with other factors such as falsifiability metrics to determine the final CF delta for the CI unit. The CF delta may incorporate the confidence level as a primary input or weighting variable, resulting in a data point that reflects both the system's belief in the inference and its susceptibility to revision. The CF delta may then be stored in association with the CI unit within the CI log, enabling downstream use in inference generation, agent simulation, and prompt conditioning for large language models.

With continued reference to FIG. 1, in one or more embodiments, socratic engine 132 may be configured to assign CF delta using one or more computational methods, including but not limited to rule-based systems, machine learning models, and large language models (LLMs), either independently or in hybrid configurations. The process of assigning a CF delta 136 may include multiple stages, each designed to evaluate distinct characteristics of the CI unit 124 in relation to its origin, content, and testability. In one or more embodiments, socratic engine 132 may utilize a rule-based inference framework that applies predefined logical rules to assess structural and semantic attributes of a CI unit 124. For example, the engine may apply deterministic rules to classify a unit as "explicit," "inferred," "contradicted," or "ambiguous" based on syntactic markers, sentiment indicators, or metadata associated with the originating user request 120. These rules may further associate each classification with a default confidence range or falsifiability potential, which is then factored into the CF delta 136 calculation. In one or more embodiments, socratic engine 132 may include one or more trained machine learning models, such as decision trees, support vector machines, or deep learning networks, configured to ingest a set of feature vectors derived from the CI unit 124. Features may include, without limitation, natural language certainty expressions, temporal distance from prior validating events, alignment with previously verified CI units 124, and historical consistency of similar inference types. The machine learning model may output a probabilistic confidence score and a falsifiability score, which may be aggregated or normalized into the composite CF delta 136 value. In one or more embodiments, the socratic engine 132 may include and/or communicate with LLM to perform semantic reasoning and natural language evaluation of the CI unit 124 and its context. For example, the LLM may be prompted with the CI unit 124 and relevant conversational or behavioral history, along with instructions to estimate the plausibility, specificity, and verifiability of the inference. The output may include scalar or ranked scores reflecting epistemic reliability, and these scores may serve as either direct inputs or advisory signals to downstream scoring systems. In one or more embodiments, Socratic engine 132 may apply an ensemble approach whereby outputs from rule-based logic, machine learning classifiers, and LLM-based reasoning are weighted and fused to compute a final CF delta 136. In one or more embodiments, a meta-model may be trained to calibrate inputs based on validation history, user behavior, and feedback loops. The weighting may be dynamically updated using performance monitoring and ground-truth validation of prior CF deltas.

With continued reference to FIG. 1, in one or more embodiments, CF delta 136 may computed using a weighted scoring algorithm that integrates multiple quantitative and qualitative features derived from the characteristics of the CI unit 124, the user request 120 from which it was extracted, and any available validation data. In one or more embodiments, CF delta 136 may be represented as a normalized floating-point value, such as a number between 0.0 and 1.0, or as a tuple (e.g., confidence, falsifiability), where each component is independently scored and contributes to an overall inference strength measure. In one or more embodiments, embodiments, CF delta 136 may be calculated using a multi-feature scoring model. In one or more embodiments, a multi-feature scoring model may assign a score or value to multiple features in order to produce an aggregated value that represents CF delta 136. In one or more embodiments, a multi-feature scoring model may compute a linguistic certainty score. In one or more embodiments, linguistic certainty score may include a measure derived from the syntactic and semantic certainty of the user's statement. For example, a declarative statement like "I have diabetes" may score 0.95, while "I might have had some symptoms" may score 0.4. In one or more embodiments, a multi-feature scoring model may compute a feasibility index. In one or more embodiments, a falsifiability index may assess whether the claim is testable or verifiable. For example, a specific claim ("I take 500 mg of Metformin daily") may score 1.0, whereas a vague impression ("I feel better today") may score 0.2. In one or more embodiments, a multi-feature scoring model may compute a temporal relevance score. In one or more embodiments, a temporal relevance score may indicate a recency of the data. For example, inferences derived from very recent interactions (e.g., same session) may receive a higher weight (e.g., 0.8-1.0), whereas older or less contextually relevant inferences may be downgraded. In one or more embodiments, a multi-feature scoring model may compute a validation support score. In one or more embodiments, a validation support score may evaluates corroborative evidence from other CI units 124, stored inference units 140 and/or other external data. For example, a unit supported by two other confirmed CI units 124 may get a +0.2 boost. In one or more embodiments, a multi-feature scoring model may compute a contradiction risk. In one or more embodiments, a contradiction risk may include a penalty score (negative weight) based on whether conflicting CI units 124 exist. In one or more embodiments, contradictions lower CF delta 136, whereas lack of contradiction may increase or keep CF delta 136 the same. In one or more embodiments, a multi-feature scoring model may include an interaction frequency weight wherein Inferences mentioned or referenced frequently across sessions may receive a boost. For example, a similar CI unit 124 (in comparison to a stored inference unit 140) that is extracted may receive +0.1 per recurrence. In one or more embodiments, scores generated by a multi-feature scoring model may be aggregated to generate CF delta 136. In one or more embodiments, each score may be weighted differently depending on importance. For example, a contradiction score may have a higher weighting than a recurrence score. In one or more embodiments, socratic engine 132 can re-score CF delta 136 as new data is observed. For example, if a user later states "I've never been allergic to any medications," the contradiction risk on the earlier penicillin allergy CI unit 124 is re-evaluated, reducing its CF delta 136 from 0.85 to 0.55, and possibly flagging it for further validation or user clarification.

With continued reference to FIG. 1, in one or more embodiments, socratic engine 132 may compare CI units 124 to a plurality of stored inference units 140 and assign CF delta 136 to CI units 124. In one or more embodiments, contradictions between CI units 124 and stored inference units 140 may negatively affect CF delta 136, whereas similar CI units 124 may positively affect CF delta 136. In one or more embodiments, each stored inference unit 140 may contain a stored delta 144. A "stored delta" as described in this disclosure is a CF delta 136 previously assigned to a stored inference unit 140. In one or more embodiments, when processing new or updated user requests, socratic engine 132 may be configured to compare newly generated CI units 124 against stored inference using similarity scoring techniques, such as semantic embedding comparisons, structural pattern matching, or identifier-based lineage tracking. In one or more embodiments, in instances in which a generated CI unit 124 is determined to be substantially similar or contextually equivalent to a stored inference unit 140, Socratic engine 132 may retrieve the corresponding stored delta 144 and apply a temporal adjustment, contextual weighting, or validation factor to update value of the stored delta 144. This updated stored delta 144 value may reflect current user interactions, environmental inputs, or additional data received since the original inference was logged. The adjustment may also account for the age of the original CF delta 136 and any intervening validation events or contradictions. Additionally or alternatively, if CI unit 124 is determined to be novel or sufficiently distinct (e.g., containing altered implications, originating from a different conversational context, or expressing a revised hypothesis) socratic engine 132 may assign a new CF delta 136 independently of prior values. In one or more embodiments, system may retain both the new and the original CI units 124, each associated with their respective deltas. In one or more embodiments, socratic engine 132 may receive CI units 124 and assign CF delta 136 to each CI unit 124 as a result. In one or more embodiments, socratic engine 132 may be configured to update a stored delta 144 for one or more stored inference units 140 as a function of CF delta 136 and CI unit 124.

With continued reference to FIG. 1, in one or more embodiments, Socratic engine 132 may further function as a real-time validation and governance module configured to enforce ethical constraints, detect behavioral anomalies, and maintain logical consistency across inference processes. As used herein, a "validation and governance module" refers to a system component that monitors inference generation. In one or more embodiments, validation and government module may assess compliance with predefined behavioral rules or ethical frameworks, and trigger alerts or interventions based on anomalous system activity. In one or more embodiments, Socratic engine 132 may cross-reference agent behavior, such as language use, recommendation scope, or decision heuristics, against a predefined rule set associated with the agent identifier or agent profile. This rule set may be derived from institutional policies, professional guidelines, user-specific guardrails, or regulatory standards. In one or more embodiments, Socratic engine 132 may analyze CF delta shifts, defined as significant increases, decreases, or volatility in assigned CF delta 136 values over time, across related CI units 124. A shift beyond a predefined threshold may be treated as a signal of degraded inference quality, conflicting behavior, ethical drift, or emergent contradictions. In response, Socratic engine 132 may trigger one or more rule-based alerts, which may include logging an audit event, pausing inference propagation, flagging the CI unit for human review, or modifying the simulation environment. In one or more embodiments, Socratic engine 132 may maintain a catalog of trigger conditions, each mapped to a remediation protocol based on the nature of the anomaly (e.g., unauthorized disclosure, contradictory health advice, tone deviation, or misalignment with agent role constraints). In one or more embodiments, Socratic engine 132 may also monitor for violations of agent behavioral scopes as defined by the corresponding agent ID, including ethical boundaries, scope-of-practice limits, or fiduciary role constraints as described above. When a CI unit 124 violates one or more of these constraints, such as an educational agent offering therapeutic advice, or a fiduciary agent exhibiting inconsistent tone. In one or more embodiments, socratic engine 132 may intervene by suppressing the output, rerouting the request, appending disclaimers, or automatically reducing CF delta 136 to reflect reduced trustworthiness. In this manner, Socratic engine 132 acts not only as a similarity comparator but as a policy-enforcing layer that ensures system outputs remain consistent with contextual, ethical, and regulatory expectations.

With continued reference to FIG. 1, in one or more embodiments, each CI unit 124 that is validated above a predefined CF delta 136 threshold may be assigned an Optimized Cognitive Inference (OCI) token. As used herein, an "Optimized Cognitive Inference token" (OCI token) refers to a metadata artifact, digital marker, or symbolic representation assigned to a CI unit 124 indicating that it has met or exceeded system-defined criteria. In one or more embodiments, OCI tokens may serve as proxies for agent quality, inference validity, or value attribution within the system. In one or more embodiments, the OCI token may encode attributes such as the CF delta score at the time of validation, the associated agent identifier, timestamp of issuance, and a summary of the validation path (e.g., peer CI agreement, Socratic engine verification, simulation-based stability). In one or more embodiments, OCI tokens may be used to track, rank, or audit agent performance over time, and may be aggregated to generate a cumulative performance profile associated with a given agent ID. For example, an agent with a high volume of CI units 124 tagged with OCI tokens across multiple sessions may be deemed more reliable or trusted in a given domain. In one or more embodiments, OCI tokens may also influence future CF delta assignments by serving as reinforcement anchors, where previously optimized inferences act as validated priors during ongoing or resumed sessions. Additionally, OCI tokens may be used for downstream operations, such as surfacing high-trust inferences in simulations, enabling faster continuity resumption, or generating transparent audit trails for human reviewers or regulatory observers. In one or more embodiments, OCI token issuance may be governed by the Socratic engine 132, which may apply a validation protocol that evaluates not only CF delta values but also ethical compliance, behavioral consistency, and user-specific constraints before issuing the token. OCI tokens may further be revocable if subsequent inference events undermine the validity or consistency of the originally validated CI unit. In this way, the system maintains a dynamic and accountable layer of quality assurance over long-running, memory-driven agent interactions.

With continued reference to FIG. 1, processor 108 is configured to append CI unit 124 and CF delta 136 to a cognitive inference log. A "cognitive inference (CI) log" as described in this disclosure is a data structure configured to store CI units 124 and any other information pertaining to a user. In one or more embodiments, the CI log 148 may function as a persistent memory repository that records each CI unit 124 along with associated metadata, including timestamps, CF delta 136 scores, validation states, and linkage to prior or related CI units 124. In one or more embodiments, CI log 148 may include a plurality of stored inference units 140 and associated stored deltas 144. In one or more embodiments, once CI units 124 and associated CI deltas are appended to CI log 148, they may be referred to as stored CI units 124 and stored deltas 144, respectively. In one or more embodiments, CI log 148 may be associated specifically to user. In one or more embodiments, system 100 may contain a plurality of CI logs, wherein each CI is associated with a particular user. In one or more embodiments database 116 may include a plurality of CI logs. In one or more embodiments, each CI log 148 of a plurality of CI logs may be associated with a differing user. In one or more embodiments, each CI log 148 may be associated with a unique user identifier 128. In one or more embodiments, system 100 may be configured to identify and/or extract user identifier 128 within or associated with user request 120 and correlate user identifier 128 to one CI log 148 containing the same user identifier 128. In one or more embodiments, user identifier 128 may be used to identify and/or retrieve CI log 148 associated with user. In one or more embodiments, a plurality of CI logs may be stored on database, wherein one CI log 148 may be identified and retrieved based on user identifier 128.

In one or more embodiments, system 100 may be configured to support a plurality of CI logs for a single user, wherein each CI log 148 is independently associated with a distinct agent profile. For example, and without limitation, a first CI log 148 may contain an agent profile associated with a lawyer and a second CI log 148 may contain an agent profile associated with a care provider. The association between a CI log 148 and an agent profile may allow for system 100 to simulate different behavioral, professional, or functional roles for the large language model (LLM) in a domain-specific manner. Each CI log 148 may acts as an isolated memory structure tailored not only to the user but also to the desired interaction style, tone, or area of expertise. In one or more embodiments, a user may request interaction with a specific agent profile in a variety of ways. In one embodiment, the user may include an explicit profile designation as part of their user request 120, such as "act as my attorney" or "respond as a psychiatrist." As a result, system may be configured to parse this instruction using natural language processing techniques or structured command recognition logic. Once the agent profile is extracted, system 100 may use the combination of the user identifier 128 and the agent profile label as a composite key to identify a matching CI log 148 in the database.

With continued reference to FIG. 1, in one or more embodiments, each CI log 148 may contain an agent identifier that distinguishes among multiple CI logs or multiple CI logs linked to the same user. An "agent identifier" (also referred to herein as an agent ID) as described in this disclosure is a data element configured to uniquely identify an agent profile associated with a CI log 148. The agent identifier may be implemented as a label, alphanumeric string, object pointer, or metadata tag that distinguishes one agent profile from another. In one or more embodiments, the agent identifier may encode, or reference parameters associated with the behavior, role, or domain-specific characteristics of an artificial intelligence agent configured to interact with a user. These characteristics may include but are not limited to functional role (e.g., legal advisor, medical professional, therapist, educator), tone or affect (e.g., empathetic, formal, technical), communication style (e.g., dialect, language, verbosity), ethical constraints, or regulatory compliance indicators. In one or more embodiments, each agent identifier is associated with a corresponding CI log 148, such that a user may maintain multiple CI logs, each distinguished by a different agent identifier. This enables system 100 to simulate and preserve separate role-specific memory and interaction histories for the same user across distinct domains. In one or more embodiments, agent identifier may be used by system to retrieve the appropriate agent profile when generating responses from an LLM, ensuring that outputs remain contextually consistent with the intended persona or professional role. In one or more embodiments, user request 120 may include agent identifier. In one or more embodiments, user identifier 128 may include agent identifier. In one or more embodiments, processor 108 may be configured to retrieve user identifier 128 and/or agent identifier and retrieve the associated CI log 148 from a plurality of CI logs. In one or more embodiments, a combination of user identifier 128 and an agent ID may serve as a compound key that system 100 may use to identify or retrieve the appropriate CI log 148 from the database. If the compound key matches an existing CI log 148, system 100 may append any new CI units 124 and CF deltas to that log. If the key does not match an existing record, a new CI log 148 is created and associated with the specified user and agent ID. This ensures that each user-agent relationship is uniquely tracked and maintained over time. In one or more embodiments, agent ID may be stored in CI log 148 and may also govern how the LLM responds to future requests using that log. For example, when inference engine retrieves CI units 124 from the CI log 148 and prepares a contextual prompt, it may use the agent ID to retrieve the corresponding agent profile, which dictates how the LLM conditions its output. This linkage ensures that the correct role, voice, and cognitive framing are applied during the response generation process. In one or more embodiments, agent ID may also be used to enforce boundaries between CI logs. For example, CI logs with different agent IDs may be restricted from sharing CI units 124, thereby maintaining professional or contextual compartmentalization (e.g., legal advice is not mixed with medical guidance). This allows for clean, domain-specific memory threads and supports regulatory or ethical compliance where appropriate.

With continued reference to FIG. 1, system 100 may receive user identifier 128 and/or agent identifier and retrieve CI log 148. If a CI log 148 already exists for the user under the specified agent profile, system 100 may retrieve the corresponding CI log 148 and appends any newly extracted CI units 124 and associated CF deltas to that log. This enables the LLM to generate responses that reflect both the user's historical interactions within that profile context and the behavioral rules encoded in the agent profile (e.g., tone, formality, domain-specific language, ethical guidelines). In one or more embodiments, if no CI log 148 exists for the user-agent profile combination, system 100 may be configured to instantiate a new CI log 148. This new log may be initialized using the user identifier 128, the requested agent profile, and any initial CI units 124 and CF deltas derived from the current interaction. In one or more embodiments, system 100 may store metadata linking this CI log 148 to both the user and the agent profile, enabling future retrieval through the same composite identifier. In one or more embodiments, the agent profile itself may be implemented as a structured data object containing a set of behavioral constraints, response styles, domain-specific knowledge flags, and language or dialect preferences. When the LLM is invoked, the system uses the active agent profile associated with the CI log 148 to condition the LLM prompt. This may ensure, for example, that a legal advisor persona maintains formality and uses legal terminology, whereas a clinical psychiatrist persona may incorporate empathetic tone and questioning styles consistent with psychological interviewing frameworks. In one or more embodiments, a user may a switch between agent profiles within a session or across sessions. When a switch is detected, either explicitly by user instruction or implicitly based on interaction content, system 100 may re-evaluate the active CI log 148 and, if necessary, transitions to a different log corresponding to the new agent profile. This allows for system 100 to maintain logically distinct memory spaces for each persona, supporting modular, role-specific AI behavior while preserving user identity and long-term context in each domain.

With continued reference to FIG. 1, processor 108 may be configured to receive a user identifier 128 from a user request 120. Upon receiving the user identifier 128, processor 108 may initiate a query of a database configured to store a plurality of CI logs. The query is performed to determine whether a CI log 148 already exists that corresponds to the received user identifier 128, optionally in combination with an agent identifier. If a CI log 148 matching the query parameters is found, processor 108 retrieves the existing CI log 148 for further use, including the appending of new CI units 124 and associated CF deltas. In one or more embodiments, if processor 108 determines that no existing CI log 148 is associated with the received user identifier 128 (or with the user identifier 128 and agent identifier combination), system 100 may be configured to instantiate a new CI log 148. The new CI log 148 may be initialized with metadata including, but not limited to, the user identifier 128, the current date and time, a session identifier, and, where applicable, an agent identifier corresponding to a selected or inferred agent profile. Once created, the system stores the new CI log 148 in the database, thereby enabling future interactions with the same user and/or agent to be associated with the same persistent inference structure. In one or more embodiments, CI units 124 and CF delta may then then be stored in CI log 148. In one or more embodiments, any user requests containing requests for a particular agent profile may also be stored in CI log 148.

With continued reference to FIG. 1, generating one or more CI units from the one or more user requests may include identifying a user identifier and an agent identifier within one or more user requests, querying a database comprising a plurality of CI logs using the user identifier and the agent identifier and initializing a new CI log containing an initialized agent profile as a function of the query, the user identifier and the agent identifier. In one or more embodiments, the user identifier may be extracted from metadata associated with the user request (e.g., login credentials, device identifiers, session tokens) or from structured content provided by the user. Similarly, the agent identifier may be explicitly stated within the user request (e.g., "respond as a doctor") or inferred based on known preferences, system configuration, or linguistic cues within the request itself. Following the identification of the user and agent identifiers, processor may perform a query operation directed to a database containing a plurality of CI logs. This query uses the combination of the user identifier and the agent identifier as a compound lookup key. The purpose of this query is to determine whether an existing CI log already exists that corresponds to both the user and the intended agent profile. If such a CI log is found, it is retrieved for further processing and appending of newly generated CI units and associated CF deltas. In one or more embodiments, if the query returns no results (indicating that the user has not previously interacted with the system under the specified agent profile) processor may proceed to initialize a new CI log. The initialization includes associating the new CI log with the received user identifier and agent identifier. Processor may also instantiate a new agent profile within the log, defining parameters such as professional role, response tone, ethical rules, language preferences, or domain-specific knowledge boundaries based on the agent identifier. The newly initialized CI log is stored in the database and thereafter used to retain the CI units and CF deltas generated from the ongoing user interaction. This ensures that even first-time users or newly invoked agent profiles are immediately supported by a structured and persistent cognitive inference memory framework. In one or more embodiments, processor may initialize a new CI log by creating a CI log for user, wherein the new CI log may contain user identifier and agent profile. In one or more embodiments, initializing new CI log may include assigning and/or appending an agent profile to CI log to dictate how the CI log should act.

With continued reference to FIG. 1, in one or more embodiments, an agent (wherein the agent includes a CI ledger with specific agent identifiers and/or rules) identified by a unique agent identifier may further operate as a role-specific fiduciary agent. As used herein, a "role-specific fiduciary agent" refers to an agent that is configured to maintain a persistent, ethically constrained simulation relationship with a user. In one or more embodiments, the agent's behavior, memory, and interaction scope may be governed by a defined ethical or regulatory framework. In one or more embodiments, role-specific fiduciary agents may be memory-bound entities that preserve long-term, role-specific continuity by consistently referencing and updating the same CI log 148 associated with the compound key comprising a user identifier 128 and agent identifier. In one or more embodiments, fiduciary agents may be instantiated to simulate professional roles such as licensed therapists, legal counsel, case workers, or clinical providers, and may maintain durable behavioral scopes that define boundaries of permissible actions, advice domains, and agent conduct. These scopes may be embedded in or referenced by the agent profile linked to the agent ID and may include constraints such as jurisdictional limitations, informed consent conditions, or disclosure requirements. In one or more embodiments, fiduciary agents may be subject to audit frameworks, which may include metadata logging, version tracking, and integrity constraints on CI units 124 and associated CF deltas. The audit framework may support review of agent decision-making and behavior over time, ensuring traceability, accountability, and alignment with institutional or legal standards. The persistence of the fiduciary agent's simulation relationship may be maintained across multiple sessions or devices, and the system may enforce isolation of CI logs between different fiduciary roles to preserve confidentiality and prevent domain leakage. For example, a user's interactions with a therapeutic agent may be cryptographically partitioned from those with a legal advisory agent, even if both agents are accessed by the same user account. In one or more embodiments, system 100 may use the agent ID not only to condition response generation and retrieval behavior, but also to govern how the simulation environment evolves, ensuring that long-term user-agent relationships are simulated in a role-faithful and ethically compliant manner. In one or more embodiments, each agent (wherein each agent may refer to a CI log with a differing agent identifier) may contain identities, tones, memories and/or the like that are preserved with each CI log. In one or more embodiments, agents may differ even for similar users as different agents are used for differing tasks to projects.

With continued reference to FIG. 1, in one or more embodiments, agent identifier may correspond to a fiduciary agent with a defined bounded behavioral scope, persistent memory constraints, and audit-linked simulation continuity. As used herein, a "bounded behavioral scope" refers to a predefined set of rules or ethical boundaries that restrict the fiduciary agent's allowable responses, simulation authority or reasoning scope. In one or more embodiments, these constraints may be based on legal or professional standards (e.g., HIPAA, legal ethics rules, educational policies) and may be enforced through logic embedded in the agent profile associated with the agent identifier. In one or more embodiments, bounded behavioral scope may include topic gating, tone enforcement, response suppression logic, or cross-agent communication restrictions. "Persistent memory constraints," as described in this disclosure refers to a fiduciary agent's requirement to continuity by storing and retrieving CI units within the same CI log while simultaneously honoring context isolation rules. For example, an agent may recall user preferences, prior decisions, and emotional states relevant to a therapeutic simulation, but remain incapable of accessing or referencing CI units associated with an unrelated legal or financial agent. In one or more embodiments, the agent identifier may link to audit-linked simulation continuity, wherein the simulation environment maintained by the fiduciary agent includes metadata sufficient for traceability, external review, or compliance validation. This may include CI unit-level audit markers, simulation continuity flags, and checkpoint identifiers that together enable simulation reentry, retrospective reconstruction, and accountability enforcement. In such embodiments, system 100 ensures that the fiduciary agent not only behaves according to its bounded scope and memory discipline but also supports long-term simulation relationships that are auditable, ethically aligned, and state-persistent across user sessions.

With continued reference to FIG. 1, in one or more embodiments, system 100 may support audit-linked simulation continuity as part of its agent-governance and compliance architecture. "Audit-linked simulation continuity" as described in this disclosure refers to the capability of an agent to persist across sessions while retaining metadata, structural checkpoints, and continuity markers to enable retrospective audit, traceability, and compliance validation. In one or more embodiments, audit-linked simulation continuity includes embedding audit-relevant metadata into one or more CI units 124, such as timestamps, agent identifiers, decision tags, CF delta evolution, and simulation continuity flags. These elements enable third-party reviewers, regulators, or internal audit systems to reconstruct the flow of user-agent interactions, verify the integrity and origin of agent outputs, and assess compliance with domain-specific ethical or legal standards. In one or more embodiments, audit-linked simulation continuity may ensure that a simulation resumed from a prior CI trail or checkpoint preserves not only the functional or narrative state, but also the auditability of its history, including the rationale behind prior decisions, agent role constraints in effect, and continuity of memory access. This capability may be particularly applicable in regulated domains such as mental health, law, finance, or education, where persistent simulations must remain reviewable and explainable long after the original interaction occurred. In such embodiments, the simulation continuity itself becomes a governable object, enabling both prospective engagement and retrospective accountability.

With continued reference to FIG. 1, CI log 148 may include CI units 124 and CF delta 136 that have been appended to CI log 148. In one or more embodiments, CI log 148 may include CI units 124 such as agent profile. In one or more embodiments, CI log 148 may contain a plurality of stored inference units 140 and stored deltas 144. In one or more embodiments, system 100 may be configured to generate CF delta 136 for each CI unit 124 by comparing CI units 124 to stored inference units 140 and stored deltas 144. In one or more embodiments, system 100 may use user identifier 128 to locate CI log 148 and may use elements associated with CI log 148 to generate CF delta 136. In one or more embodiments, if a CI log 148 is not located, system 100 may generate a new CI log 148 for user and append CI units 124 and CF delta 136 to CI log 148. In one or more embodiments, in instances in which CI log 148 does not contain stored inference units 140, CF delta 136 may be generated absent a comparison to stored inference units 140. In one or more embodiments, each CI log 148 of a plurality of CI logs located on database is associated with a differing user. In one or more embodiments, processor 108 may be configured to identify CI log 148 associated with user and/or user identifier 128 and append CI units 124 and CF delta 136 to CI log 148.

With continued reference to FIG. 1, appending CI units 124 and CF delta 136 may include updating a stored delta 144 for one or more stored inference units 140 within the CI log 148 as a function of the CF delta 136 and the one or more CI units 124. When a newly generated CI unit 124 is determined to be similar, equivalent, or overlapping in scope or subject matter with a stored inference unit 140 already present in CI log 148, system 100 may initiate an update operation on the corresponding stored delta 144. This update operation may involve either replacing the stored delta 144 entirely with the current CF delta 136, or modifying the stored delta 144 using the current CF delta 136 as an adjustment factor, weighting coefficient, or function parameter. In one or more embodiments, system 100 may apply similarity detection algorithms to compare the semantic, structural, or topical content of a new CI unit 124 to that of stored inference units 140. Similarity may be computed using vector embeddings, token overlap metrics, ontology matching, or model-based semantic comparison. Upon determining a similarity threshold has been met or exceeded, socratic engine 132 may compute a new CF delta 136 as a function of both the current delta and the previously stored delta 144, optionally incorporating weighting heuristics such as time decay, user reliability scores, contextual relevance, or validation history. For example, if a CI unit 124 reaffirms a prior inference, the CF delta 136 may be increased to reflect heightened confidence. Conversely, if the CI unit 124 introduces uncertainty or partial contradiction, the CF delta 136 may be reduced accordingly, without fully invalidating the inference. In one or more embodiments, system 100 may maintain a versioning record for each stored inference unit 140 within the CI log 148, such that each update operation creates a new version or instance of the CI unit 124 with its updated CF delta 136 while retaining the prior version for auditability and comparison. This supports traceability of inference evolution over time and enables rollback or confidence analysis at various stages. Additionally, the update logic may support branching, in which similar CI units 124 from different sessions or user contexts result in distinct delta updates, allowing for system to maintain divergent views on inference confidence based on agent identity, context, or domain-specific usage. In one or more embodiments, CF delta may be modified by a user, $3^{rd}$ party and/or the like. In one or more embodiments, a user correction may provide modification to a CF delta to provide an accurate value. In one or more embodiments, inputs made by a supervisor and/or regulatory overrides may be used to modify CF delta.

With continued reference to FIG. 1, in one or more embodiments, the CF deltas 136 may be subject to real-time adjustment based on external validation signals, including but not limited to user correction inputs, compliance overrides, and supervisor authorizations. In one or more embodiments, CF deltas may be modified based on inputs made bay an individual, external validation signals and/or the like. "External validation signals" as described in this disclosure refers to any post-inference input originating outside an autonomous reasoning processes of system 100. In one or more embodiments, such inputs may serve to confirm, refute, modify, or contextualize the confidence value previously assigned to an inference. In one or more embodiments, a user may provide a correction input (such as selecting an incorrect suggestion, annotating a factual error, or manually downgrading a recommendation) which may trigger a recalculation or override of the CF delta 136 associated with the corresponding CI unit 124. In another embodiment, a compliance engine, regulatory module, or domain-specific policy checker may issue a compliance override, adjusting CF delta 136 downward if an inference fails to meet external legal, ethical, or procedural standards. In one or more embodiments, supervisor authorization may be used to modify CF delta. In one or more embodiments, supervisor authorization refers to inputs made by designated human overseers, such as licensed professionals, administrative reviewers, or system auditors, who are empowered to confirm or alter CF deltas based on judgment, expertise, or cross-referenced documentation. The system may log such adjustments as metadata fields within the CI unit 124 or stored inference unit 140, indicating the source and rationale for the override. These adjustments may also update the associated stored delta 144 and be incorporated into downstream reasoning, validation scoring, or audit trails. In some embodiments, external validation signals may trigger an update operation with elevated weight, enabling the adjusted CF delta to propagate preferentially in similarity-matching algorithms, agent confidence profiles, or simulation rendering outputs. This allows system 100 to remain responsive to both human supervision and institutional oversight, while maintaining a dynamic, real-time trust metric across CI units and inference sequences. In one or more embodiments, each CF Delta may be subject to real-time adjustment based on external validation signals.

With continued reference to FIG. 1, in one or more embodiments, CI log 148 may serve as a memory and inference framework for static LLM 106 by providing continuity, personalization, and reasoning traceability across multiple user interactions. In one or more embodiments, unlike a traditional memory store, the CI log 148 may be structured to behave as a quantum ledger, characterized by instantaneous accessibility, universal agent interoperability, antifragile data structuring, and dynamic contextual updating. In one or more embodiments, CI log 148 may be configured to stored ongoing conversations (as CI units 124), enabling system 100 to record and store cognitive context from prior sessions. This allows static LLM 106 to resume a simulation or dialogue based on prior exchanges, thereby creating a sense of seamless continuity for the user even if the LLM itself is static and lacks persistent memory. In one or more embodiments, the CI log 148 may allow for inferred clinical views, including inferred cognitive, behavioral, or emotional states that may be associated with a user's mental or physical condition. These clinical views may be extracted via CI units 124 that include agent profiles for care providers (e.g., clinical psychiatrists) and recorded in CI log 148 to aid in ongoing analysis, user modeling, or safety monitoring. In one or more embodiments, CI log 148 may be referred to as a quantum ledger, due to its ability to be instantaneously accessed by any authorized individual or system, including new or external language models. When a new system accesses CI log 148, it may be assigned a new identifier and an alias that allows it to interpret the CI units 124 within the ledger or log in a manner tailored to the user or simulation environment. In one or more embodiments, CI log 148 may operate as a dynamic, continuously updating ledger or log, where each user interaction may result in the generation of new CI units 124 that are appended to CI log 148.

With continued reference to FIG. 1, in one or more embodiments, information, such as CI units 124 may be appended to the CI log 148 through a structured data logging process that occurs upon the generation of one or more cognitive inference (CI) units in response to a user request 120 or system operation. Each CI unit 124, once extracted and optionally assigned a confidence-falsifiability (CF) delta or other metadata, may be serialized into a standard data format (e.g., JSON, XML, protocol buffers) and appended to CI log 148 in a time-sequenced manner. "Appending" as described in this disclosure refers to a process of adding a new entry to an existing data file. In one or more embodiments, appending CI units 124 may include adding CI units 124 to CI log 148. In one or more embodiments, an appending process may involve the use of a transactional write system configured to verify the integrity of each CI unit 124 prior to its inclusion within CI log 148. This verification may involve schema validation, digital signature confirmation, semantic checks (e.g., determining that the data type or inference structure aligns with system expectations), and indexing of CI unit 124 types for future retrieval. The ledger system may also include mechanisms to resolve redundancy, manage conflicting inferences, or flag potentially invalid CI units 124 for deferred review, thereby supporting operational reliability and traceability.

With continued reference to FIG. 1, CI log 148 may be stored on an immutable sequential listing 152. An "Immutable sequential listing" as described in this disclosure refers to a data structure wherein each entry is permanently fixed once written and is ordered in the sequence in which it was added. In one or more embodiments, design of a design of immutable sequential listing 152 ensure chronological integrity, verifiability, and auditability of all data stored within the ledger or log. In one or more embodiments, each entry (e.g., CI unit 124 and/or CF delta 136) may contain a timestamp, a unique identifier, a pointer or hash of the previous entry, and/or the actual CI unit 124 data including associated metadata (e.g., CF delta 136, user identifier 128, inference type, session context). In one or more embodiments, the immutable sequential listing 152 may be configured to support fine-grained time resolution, such that each CI unit 124 may be precisely tied to the conversational moment in which it was generated. Additional metadata may include semantic tags, referencing indices, CI type classifiers (e.g., contextual, agent-profile, tone), and alias mappings, especially in cases where multiple LLMs access a shared CI log 148 under different user identifiers or session instances. Integrity of the sequence may be enforced using Merkle trees, forward and reverse hash chains, or similar cryptographic methods to allow traceability of historical changes and branching analysis. In one or more embodiments, the immutable sequential listing 152 is implemented using blockchain technology. A "blockchain" as described in this disclosure is a distributed, cryptographically secure ledger composed of a chain of data blocks, each of which contains a batch of transactions or entries and a cryptographic hash of the previous block. In one or more embodiments, a blockchain structure guarantees immutability and prevents tampering, as any alteration in a previous block would invalidate all subsequent hashes. In one or more embodiments, CI log 148 may be implemented using blockchain techno ology wherein each block may represent a set of CI units 124 generated within a session, time window, or interaction batch. In one or more embodiments, implementation of a blockchain may allow for allow multiple systems to interact with CI log 148 concurrently, enabling decentralized inference across environments. In one or more embodiments, each block may include access control fields indicating which systems or LLMs are permitted to read from or write to specific ledger or log segments. A consensus mechanism such as proof-of-authority, Byzantine fault tolerance, or other lightweight protocols may be used to confirm block additions, particularly in cases where the CI log 148 is distributed across cloud-based or federated LLM systems. In one or more embodiments, the blockchain may support smart contracts that trigger actions (e.g., validation checks, CF delta 136 recalculations, inference merging) upon entry of specific CI units 124. In one or more embodiments, a blockchain-based implementation allows for decentralized validation and distributed access control, where different nodes or authorized agents may verify, access, or contribute to the ledger without central coordination. Cryptographic techniques such as digital signatures and zero-knowledge proofs may be used to ensure that appending operations are performed securely and that user privacy is preserved. In one or more embodiments, a blockchain ledger may be permissioned, where only designated system components are allowed to write to or read from the CI log 148, ensuring system integrity while supporting regulated memory evolution. In one or more embodiments, the CI log 148 may include a tiered privacy protocol wherein certain metadata fields (e.g., user identifier 128, agent profile type, clinical data markers) are encrypted with role-specific keys or anonymized using homomorphic encryption or secure multi-party computation. This ensures that while CI units 124 remain accessible for inference, identifying information is masked unless accessed by an authorized engine or system. Furthermore, audit logs may be embedded into the ledger to track who accessed what information and when, with automated flagging of anomalous access patterns.

With continued reference to FIG. 1, CI log 148 may include and/or be associated with a smart contract. In one or more embodiments, CI log 148 includes a smart contract configured to bind each CI log 148 of a plurality of CI logs to a dedicated user, wherein the smart contract includes a plurality of historical log modifications associated with the CI log 148. A "smart contract" as described in this disclosure refers to a self-executing software stored on a decentralized or distributed ledger system that automatically enforces and verifies the terms and conditions encoded within it. In one or more embodiments, a smart contract contains executable logic that performs operations without requiring manual intervention once predetermined conditions are satisfied. In one or more embodiments, smart contract may be configured to manage, control, and/or verify the integrity of CI log 148 associated with a particular user. In one or more embodiments, smart contract may be configured to instantiate a user-specific CI log 148 instance upon the creation of a new user profile or upon the first user interaction with system 100. This instantiation may include assigning a unique user identifier 128, generating a private-public key pair, and initializing a ledger or log storage structure (E.G., CI log 148) capable of receiving CI units 124, CF deltas, and other user-contextual data. In one or more embodiments, smart contract may govern how data is appended to CI log 148 by validating submitted CI units 124 and CF deltas, confirming that the request originates from an authenticated source, and recording the data in an immutable and traceable format. Each modification to the CI log 148 (such as adding new inference data, updating an existing CF delta 136, or appending agent profiles or continuity data) may be processed through the smart contract. Upon validation, smart contract may generate a transaction event, which may be recorded as a cryptographically signed, timestamped entry within the immutable sequential listing 152 of CI log 148. In one or more embodiments, the smart contract may also be configured to enforce access control policies, which specify which entities or components are permitted to read from or write to the CI log 148. These access control policies can be dynamically updated, allowing system 100 to respond to changes in user preferences, system security protocols, or third-party integrations. In one or more embodiments, smart contract may include conditional logic to detect potential inconsistencies or contradictions in CI units 124 and either alert the system, request human oversight, or autonomously resolve conflicts by applying pre-defined resolution rules.

With continued reference to FIG. 1, smart contract may include a plurality of historical log modifications. A "historical log modification" as described in this disclosure refers to any modifications made to CI log 148. For example, and without limitation, historical log modification may include the addition of a CI unit 124, the modification of a stored inference unit 140, an attempt to access CI log 148 and/or the like In one or more embodiments, smart contract may contain historical log modifications detailing a version history or event log of all changes made to the CI log 148, including metadata for each event (e.g., user ID, source module, system timestamp, change type). In one or more embodiments, historical log modifications may serve as an audit trail, enabling forensic analysis, rollback functionality, or chain-of-custody verification in privacy-sensitive or compliance-driven environments. In one or more embodiments, historical log modifications may include a record of every validated change, update, or addition made to the CI log 148 over time. These modifications can include, but are not limited to: (i) the initial creation or instantiation of the CI log 148 for a given user; (ii) the appending of new cognitive inference (CI) units derived from user requests or interactions; (iii) the assignment or recalibration of confidence falsifiability (CF) deltas; (iv) updates to agent profiles or continuity data; (v) the resolution of conflicting or overlapping CI units 124; and (vi) any changes made to access control rules, user identifiers, or permission configurations. Each historical modification may be represented as a discrete, timestamped entry containing metadata such as the originating system component (e.g., socratic engine 132, chatbot interface), a hash of the affected data for integrity verification, and a reference to the smart contract execution that validated the change.

With continued reference to FIG. 1, CI log 148 includes, and/or serves as, an inference engine for static LLM 106. An "inference engine" as described in this disclosure refers to a component that enables the application of pre-existing knowledge to new data inputs. For example, and without limitation, CI log 148 may serve as an inference engine, wherein inputs into static LLM 106 may include information contained within CI log 148 which is used to provide context or rules to inputs. In one or more embodiments, CI log 148 may act as a persistent, structured memory system that can supply contextual data to static LLM 106 at runtime through a process of intelligent retrieval, ranking, and formatting of previously stored inference units 140. In this manner, CI log 148 may enable an otherwise non-adaptive static LLM 106 to engage in contextually grounded reasoning across isolated sessions, simulate memory, and maintain a coherent user interaction model over time. In one or more embodiments, CI log 148 serves as an inference engine by maintaining a continuously updated repository of CI and associated CF deltas that have been extracted or generated across one or more user sessions. Upon receiving a new user request 120, system 100 can query the CI log 148 to identify prior CI units 124 that are relevant based on semantic similarity, user identifier 128, session continuity data, or agent profile context. These retrieved units are then formatted and appended to the prompt sent to a static LLM 106, thereby influencing its output with prior inferences and enabling continuity of understanding, tone, and reasoning style. For example, if a user previously engaged in a clinical mental health session in which the CI log 148 stored a continuity datum, agent profile (e.g., "clinical psychiatrist"), and several inferred beliefs or behaviors (e.g., "user experiences anxiety in social settings"), those CI units 124 may be retrieved from CI log 148. Continuing, when the user later asks, "What can I do to be more confident during networking events?" relevant CI units 124 and corresponding CF deltas from CI log 148 may be added to the prompt sent to the LLM. The static LLM 106, though inherently unaware of previous interactions, may now respond with outputs consistent with the user's behavioral context and in the style of a trained mental health professional.

With continued reference to FIG. 1, in one or more embodiments, CF delta 136 associated with each CI unit 124 serves as a weighting mechanism used by system 100 to determine the relative importance, reliability, and contextual strength of each CI unit 124 when constructing prompts for a static large language model (LLM). The CF delta 136 represents a scalar or structured value that encodes both the confidence in the validity of the CI unit 124 and the potential for its falsifiability. In one or more embodiments, when a user submits a new request, and system 100 retrieves related CI units 124 from the CI log 148, system 100 may evaluates each unit's associated CF delta 136. Units with a high confidence and low falsifiability (e.g., CI units 124 that have been repeatedly validated across sessions or that are grounded in factual user-provided information) may be prioritized or transmitted as definitive context within the prompt to the LLM. In contrast, CI units 124 with lower confidence or higher falsifiability may be flagged as tentative or transmitted with qualifiers that reflect their provisional nature, allowing the LLM to interpret and use them accordingly. In one or more embodiments, system 100 may apply thresholding or ranking mechanisms based on CF deltas. For example, if multiple CI units 124 relate to a similar behavioral trait but differ in CF delta 136 values, only the unit with the highest delta (or cumulative delta across versions) may be selected for prompt inclusion. Alternatively, if a CI unit's CF delta 136 falls below a certain threshold, it may be excluded from the current inference to avoid biasing the LLM with weak or unverified inferences. In one or more embodiments, CF delta 136 may influence the format or tone in which the CI unit 124 is presented to the LLM. For example, high-confidence CI units 124 may be stated as factual premises in the prompt (e.g., "The user consistently reports anxiety in professional settings"), whereas lower-confidence units may be framed as hypotheses (e.g., "The user may experience some hesitation when engaging with peers"). This nuance allows the LLM to weigh the contextual data differently during generation, even without direct state awareness. In one or more embodiments, CF delta 136 can also be used to simulate the epistemic status of knowledge in multi-session conversations. For example, if an earlier CI unit 124 is later contradicted or refined, the updated delta allows for system 100 to reflect this evolution, replacing or de-emphasizing outdated assumptions.

With continued reference to FIG. 1, integration layer 102 is configured to initiate a targeted query of CI log 148 in response to a subsequent user interaction with the static large language model (LLM). A "Query," as described in this disclosure refers to a structured request for information from a data source. In one or more embodiments, querying CI log 148 includes a process by which integration layer 102 or another component of system accesses to CI log 148 to retrieve stored inference units 140 and associated data, such as confidence-falsifiability (CF) deltas, continuity data, timestamps, agent profiles, and user identifiers. In one or more embodiments, integration layer 102 is configured to query CI log 148 in order to locate and extract stored inference data that is relevant to a current or ongoing user request 120, particularly one directed to the static large language model (LLM). In one or more embodiments, a query process may involve matching current user input against indexed or categorized inference units using semantic analysis, pattern recognition, or rule-based filtering. It may also include conditions such as retrieving CI units 124 within a certain confidence threshold, within a specific time range, or that match a particular topic, user intent, or conversational state. In this manner, querying the CI log 148 enables the system to augment otherwise contextless static LLM 106 interactions with dynamic, relevant memory in the form of previously inferred knowledge tailored to the user.

With continued reference to FIG. 1, query process is designed to identify, retrieve, and transmit only the most contextually relevant CI units 124 and associated metadata (such as CF deltas or continuity data) that pertain to the current user input. The query may be initiated automatically upon detection of a user request 120, message, or prompt submission, and may occur prior to the construction of the final LLM prompt to ensure that the retrieved CI units 124 can be used in real-time as contextual inputs. In one or more embodiments, a query mechanism employed by the integration layer 102 may include logic for identifying semantic, lexical, or structural similarities between the new user interaction and previously stored CI units 124 within the CI log 148. For example, natural language parsing or embedding-based similarity models may be used to match the current user input against stored content tags, topics, or previously inferred behavioral or intent-based markers. The integration layer may also evaluate metadata linked to each CI unit 124 to further refine its query scope and return only those CI units 124 most likely to enhance the relevance of the LLM's response. In one or more embodiments, integration layer 102 may use rule-based or machine-learning driven heuristics to determine the appropriate granularity of the query. For example, integration layer 102 may select only CI units 124 with CF deltas above a predefined confidence threshold, or it may restrict the retrieval to CI units 124 generated within a certain temporal window (e.g., from the last five sessions). In one or more embodiments, the query process may include the use of indexing mechanisms. In one or more embodiments, CI log 148 may maintain one or more index tables or hashed reference structures that categorize CI units 124 by subject matter, user behavior types, or interaction modalities. The integration layer 102 may use these indices to accelerate retrieval and ensure low-latency performance, even in large-scale or multi-user environments.

With continued reference to FIG. 1, the output of the query (e.g., the selected CI units 124 and related data) may be formatted into a structured context package by integration layer 102. This package may be injected into an LLM prompt (such as user request 120) either directly or through an intermediate transformation layer that aligns the content with the static LLM's input schema. In one or more embodiments, integration layer 102 may allow for CI log 148 to serve as an on-demand, context-aware knowledge base that tailors each LLM interaction to the specific historical and behavioral patterns of the user.

With continued reference to FIG. 1, in one or more embodiments, integration layer 102 is further configured to append the plurality of stored inference units 140 to a subsequent user input as a contextual prompt 156 for the static LLM 106. A "contextual prompt" as described in this disclosure refers to supplementary information that is added to an input given to a static LLM 106. In one or more embodiments, contextual prompt 156 may include not only the user's current or subsequent user request but also a selection of previously stored inference units 140 that are retrieved and appended to the input in order to simulate continuity, memory, or user-specific context. In one or more embodiments, contextual prompt 156 is used to enable the static LLM 106 to generate more coherent, personalized, or relevant responses by referencing information derived from past engagements, reasoning, or preferences. In one or more embodiments, integration layer 102 may store CI units 124 and use them as contextual prompts for subseqeuent user requests. In one or more embodiments, subsequent user requests may include additional user requests transmitted by user. In one or more embodiments, integration layer 102 is configured to retrieve, upon receiving a subsequent user input, a subset of previously stored inference units 140 from the CI log 148 that are determined to be contextually relevant. This retrieval process may involve querying the CI log 148 using attributes derived from the new user input (e.g., semantic themes, intent, prior session identifier), and filtering results based on confidence scores, agent profiles, or other stored metadata. Once the relevant inference units are retrieved, integration layer 102 ma further be configured to append this information as a contextual prompt 156 to LLM. This composite input (containing subsequent user request and contextual prompt 156) is then transmitted to the static LLM 106, effectively providing it with simulated memory and allowing the model to generate output as though it were aware of prior interactions. The inference units appended may include continuity data, agent behavior instructions, or user-specific reasoning previously captured in the form of CI units 124.

With continued reference to FIG. 1, system 100 may be configured to transmit outputs of static LLM 106 to a user. In one or more embodiments, outputs generated by the static large language model (LLM) in response to contextual prompt 156 and user request 120 are presented to user through a chatbot system or a user interface, each of which serves as an interactive medium configured to display natural language responses and facilitate ongoing communication between the user and the system. In one or more embodiments, chatbot system may include graphical interface components such as chat windows, input fields, response areas, avatars, or audio playback mechanisms that facilitate intuitive dialogue. Upon receiving the output from the static LLM 106, the chatbot system may format the output into a human-readable form, apply stylistic adjustments as specified by an agent profile (e.g., tone, dialect, language), and render the final response for the user within the interactive session. The chatbot system may also be configured to include follow-up options, suggested queries, or quick-reply prompts based on the context of the output, enabling smoother continuation of dialogue. In one or more embodiments, outputs of static LLM 106 may be transmitted through a user interface wherein the user interface (UI) may be a graphical, web-based, or application-based interface capable of displaying the output text, images, or related media generated by the LLM. The UI may incorporate various components such as text boxes, dropdown menus, clickable elements, toggles, icons, or visualization modules. The system may transmit the LLM's output to the user interface through a communication layer or API endpoint, wherein the user interface formats and displays the information on a remote device associated with the user (e.g., desktop computer, mobile device, tablet, or wearable device). In some embodiments, the user interface may also support multimedia outputs including but not limited to audio narration, video playback, dynamic charts, or interactive simulations. The UI or chatbot system may further be configured to allow users to provide follow-up inputs or feedback regarding the response, which may in turn be used to trigger additional processing by the static LLM 106, update the CI log 148, or assign new CF delta 136 values to newly generated CI units 124. The transmission and rendering of the LLM output via these interfaces may occur synchronously or asynchronously depending on system configuration and user preferences.

With continued reference to FIG. 1, processor 108 may be configured to transmit outputs of LLM to display device. In one or more embodiments, display device may include any device as described in this disclosure. In one or more embodiments, display device may include a smartphone, a tablet, a desktop computer, a laptop and/or the like.

With continued reference to FIG. 1, in one or more embodiments, system 100 may further include an interface layer configured to present content derived from components or outputs of system 100 and/or historical interaction data. As used herein, an "interface layer" refers to a display component configured to render system-generated information in a visual or interactive format. In one or more embodiments, the interface layer may include scrollable regions, visual containers, editable fields, or modular panels for rendering CI units 124, contextual prompts 156, or outputs from static LLM 106. In one or more embodiments, the interface layer may dynamically populate or update its content based on user interaction, inference logic, or metadata retrieved from CI log 148. In one or more embodiments, SmartDoc rendering logic may be applied within the interface layer to determine how and when particular content is or should be displayed. As used herein, "SmartDoc rendering logic" refers to a rules-based or logic-driven mechanism that formats, structures, or sequences content displayed by the interface layer. The SmartDoc rendering logic may include dynamic section toggling, layout adaptation, or user-specific content prioritization. In one or more embodiments, SmartDoc rendering logic may rely on a document composition service, which refers to a software or logical component configured to apply formatting templates, bind data to placeholders, and assemble final interface outputs. This may include support for multimedia, annotation features, conditionally visible blocks, or hyperlinks.

With continued reference to FIG. 1, in one or more embodiments, the interface layer may further include a simulation rendering interface. As used herein, a "simulation rendering interface" refers to a visual component configured to display predictive or hypothetical outcomes derived from user input, past inference data, or model-generated projections. The simulation rendering interface may include graphical representations such as timelines, branching diagrams, scenario trees, or confidence visualizations. In one or more embodiments, simulation outputs may be generated using predictive logic, previously retrieved CI units 124, or profile-specific modeling. In one or more embodiments, a simulation rendering interface may allow users to engage with forward-looking scenarios or interactively explore outcome variants. In one or more embodiments, the simulation rendering interface may be presented as a dedicated area or as a context-sensitive overlay. As used herein, a "context-sensitive overlay" refers to a user interface element that becomes visible or active in response to specific interactions or contextual triggers. The simulation rendering interface may include user-driven parameters, which may include any interactive control used to modify input assumptions or scenario variables. These may include sliders, dropdown menus, toggles, or custom input fields. In one or more embodiments, simulation content may be generated or displayed using a rendering engine, which refers to a system component that transforms structured data or metadata into visual display elements for presentation within the interface layer. In one or more embodiments, the interface layer and simulation rendering interface may be configured to transmit user interaction data such as content edits, scenario selections, or feedback back to ledger integration layer 102. This interaction data may be used to generate new CI units 124, modify CF deltas, or refine user models. In one or more embodiments, the interface layer may also be configured to render, replay, or output previously stored CI unit trails for purposes such as human review, regulatory audit, or therapeutic continuity. As used herein, a "CI unit trail" refers to a collection or sequence of related CI units 124, linked by theme, timestamp, or user session. The interface layer may present CI unit trails in a structured, navigable format and may include associated metadata such as timestamps, agent profiles, or CF deltas to support interpretability and oversight.

With continued reference to FIG. 1, in one or more embodiments, the simulation rendering interface may be further configured to retrieve, display, and document prior CI sequences for purposes of agent-based review, quality assurance, or clinical/legal compliance. As used herein, a "CI sequence" refers to a temporally or thematically ordered subset of CI units 124. In one or more embodiments, CI sequence may include a set of CI units generated during a previous user-agent interaction. In one or more embodiments, CI sequence may include the order in which the CI units were generated. In one or more embodiments, CI sequence may represent a continuous reasoning thread, simulation branch, or interaction segment. In one or more embodiments, the simulation rendering interface may access CI log 148 to locate relevant CI sequences based on user identifiers, agent identifiers, session timestamps, or scenario classifications. Once retrieved, the simulation rendering interface may visually reconstruct the sequence using timelines, annotated dialogue threads, decision flow diagrams, or step-by-step scenario trees, enabling human or system-based review of agent behavior and decision pathways. In one or more embodiments, this functionality may be utilized to support oversight use cases, including clinical audit (e.g., verifying care path consistency), legal documentation (e.g., reconstructing estate planning decisions), or fiduciary validation (e.g., reviewing agent adherence to ethical boundaries). The simulation rendering interface may include export or report-generation capabilities that compile CI sequences, associated CF deltas, and agent actions into human-readable summaries or audit-ready formats. In one or more embodiments, these visualizations may be stored, bookmarked, or flagged by reviewers, and user interaction with them may itself generate new CI units 124 that reflect audit notes, approvals, or corrective observations. This enables the simulation rendering interface to function not only as a predictive visualization tool but also as a retrospective compliance mechanism within system 100.

With continued reference to FIG. 1, in one or more embodiments, the interface layer may be further configured to replay previously stored sessions between a user and system 100. In one or more embodiments, interface layer may replay previously stored such that that sequential or structured presentation of prior interactions between a user and one or more system components, such as static LLM 106, may be presented in a form that preserves the temporal, logical, or conversational flow of the original exchange. The replay functionality may allow users, auditors, clinicians, or agents to review a past session in whole or in part, including the user inputs, LLM responses, associated inference units 124, CF deltas, and relevant metadata. In one or more embodiments, the interface layer may reconstruct the original dialogue or interaction series using CI unit trails retrieved from CI log 148, arranged in chronological or topic-based order. In one or more embodiments, the replay functionality of the interface layer may include interactive controls for navigating the session, such as play, pause, step-forward, or timeline scrubbing features. The interface layer may further display each replayed message or event within a chat-style, document-style, or tabular format, and may annotate or highlight inference metadata such as confidence scores, agent attribution, or continuity markers. In some embodiments, replays may be filtered by session ID, date range, topic classification, or agent profile. The replayed session may also include visualization overlays or simulation rendering outputs generated during the original interaction, thereby allowing a viewer to observe not only the textual content but also the surrounding inference context and system state. In one or more embodiments, the replay may serve clinical, regulatory, educational, or user-facing functions, and may be used to verify reasoning, validate model behavior, or facilitate ongoing decision support.

With continued reference to FIG. 1, in one or more embodiments, system 100 and/or interface layer may further include a documentation interface configured to replay stored inference sessions using SmartDoc rendering logic. As used herein, a "documentation interface" refers to a subsystem or dedicated module within the interface layer that is designed to present structured records of prior system interactions. The documentation interface may retrieve a selected set of CI units 124, organized by session, user, or topic, and may apply SmartDoc rendering logic to display the content as a formatted session transcript, annotated record, or reconstructed dialogue. In one or more embodiments, the documentation interface may be accessible to end users, administrators, or third-party reviewers for the purpose of interpreting historical model behavior or reasoning pathways. In one or more embodiments, the documentation interface may replay stored inference sessions by rendering prior user inputs, LLM outputs, and intermediary inference units as visually distinct sections or components within a SmartDoc-rendered view. SmartDoc rendering logic may be used to format the replayed content into a document-style presentation that includes timestamps, agent attribution, confidence scores, and system annotations derived from metadata stored in CI log 148. In one or more embodiments, embodiments, the documentation interface may support features such as comment threads, session bookmarking, or cross-referencing across multiple sessions. The rendered document may also include embedded simulation snapshots, behavioral trace diagrams, or outcome branches that were generated during the original session. In this way, the documentation interface may serve as a persistent, review-ready record of system interaction history, useful for auditability, clinical decision tracking, compliance reporting, or multi-session reasoning continuity.

With continued reference to FIG. 1, in one or more embodiments, an inference session may be established between a user and system 100. As used herein, an "inference session" refers to an interaction between a user and one or more components of the system 100. In one or more embodiments, inference session may include interaction between user and static LLM 106 or ledger integration layer 102 during which a plurality of CI units 124 and corresponding CF deltas 136 are generated, stored, or updated. An inference session may begin upon receipt of a user request 120 and may persist across one or more turns of interaction, ending upon timeout, explicit termination, or a logical boundary condition. In one or more embodiments, the inference session encapsulates the full lifecycle of reasoning, including user inputs, generated outputs, inference logic applied, and associated metadata captured for continuity, traceability, or audit purposes. In one or more embodiments, documentation interface and/or interface layer may be configured to replay stored inference sessions. In one or more embodiments, system 100 may be configured to store inference sessions, wherein interface layer may be configured to replay stored inference sessions.

Figure 2:
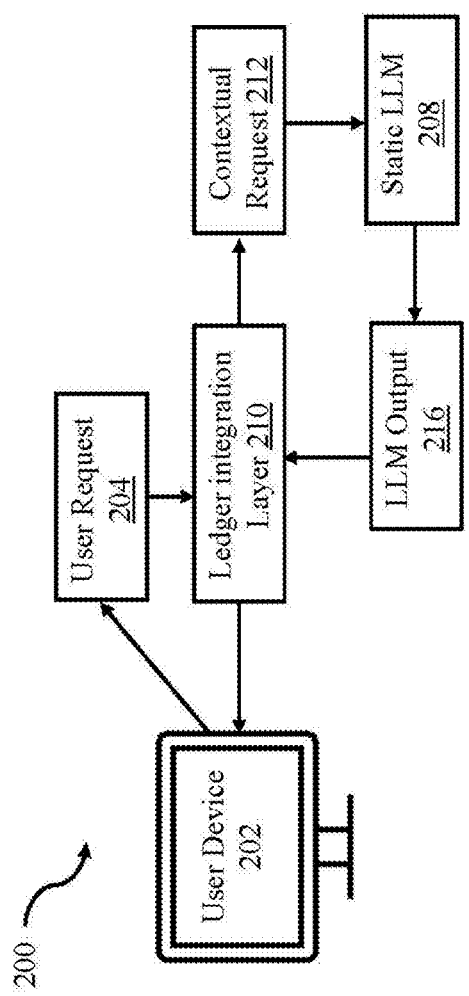
FIG. 2 is a block diagram illustrating an example embodiment of a system for generating LLM outputs.

Referring now to FIG. 2, an exemplary system 200 for generation LLM outputs is described. In one or more embodiments, system 200 may include a user device 202. A "user device" as described in this disclosure refers to a computing device associated with a user. In one or more embodiments, user device may include a smartphone, a desktop computer and/or any other device with processing power. In one or more embodiments, user device 202 may be consistent with a display device and/or remote device as described in this disclosure.

With continued reference to FIG. 2, user device 202 may transmit user request 204. In one or more embodiments, user request may include a prompt to be transmitted to static LLM 208. In one or more embodiments, user request 204 may include a prompt such as "Can you help me create a strategy for managing my anxiety over the next few weeks?" In one or more embodiments, user request may be transmitted through integration layer 210. In one or more embodiments, integration layer 210 may be configured to identify a corresponding CI log that contains information associated with a user request 204. In one or more embodiments, ledge integration layer may identify a CI log containing information associated with the user. In one or more embodiments, an exemplary CI log may include information such as:

User ID: 82314-A

Agent Profile: Clinical Psychiatrist (empathetic tone, dialect: US English)

[Stored Inference Unit 1] User has reported experiencing recurring anxiety episodes tied to work-related stress.

[Stored Inference Unit 2] User previously responded well to cognitive behavioral therapy suggestions.

[Stored Inference Unit 3] User indicated preference for daily check-ins and journaling.

Continuity Datum: Previous session ended with user requesting a follow-up plan to sustain therapeutic progress.

With continued reference to FIG. 2, in one or more embodiments, integration layer 210 may use stored inference units that provide context for user request. In one or more embodiments, integration layer 210 may generated a contextual request 212 that incorporates information from CI log and user request 204 in order to input a personalized prompt into static LLM 208. A "contextual request" as described in this disclosure is a prompt that is fed into an LLM which contains both a user request and instructions for the LLM on how to process the user request. For example, and without limitation, contextual request 212 may indicate to static LLM 208 to use simple words, given an output in a specific language and/or the like. In one or more embodiments, integration layer 210 may include information from within CI log into contextual request 212 and request from static LLM 208 to generate an output as a result. For example, and without limitation, contextual request 212 may include information within user request and additionally an agent profile requesting that the static LLM 208 generate an output similar to that of a clinical psychologist. In one or more embodiments, static LLM 208 may then be configured to generate an LLM output 216 as a result. In one or more embodiments, LLM output 216 may be transmitted to user device 202. In one or more embodiments, LLM output may be transmitted to user device and through integration layer 210.

Figure 3:
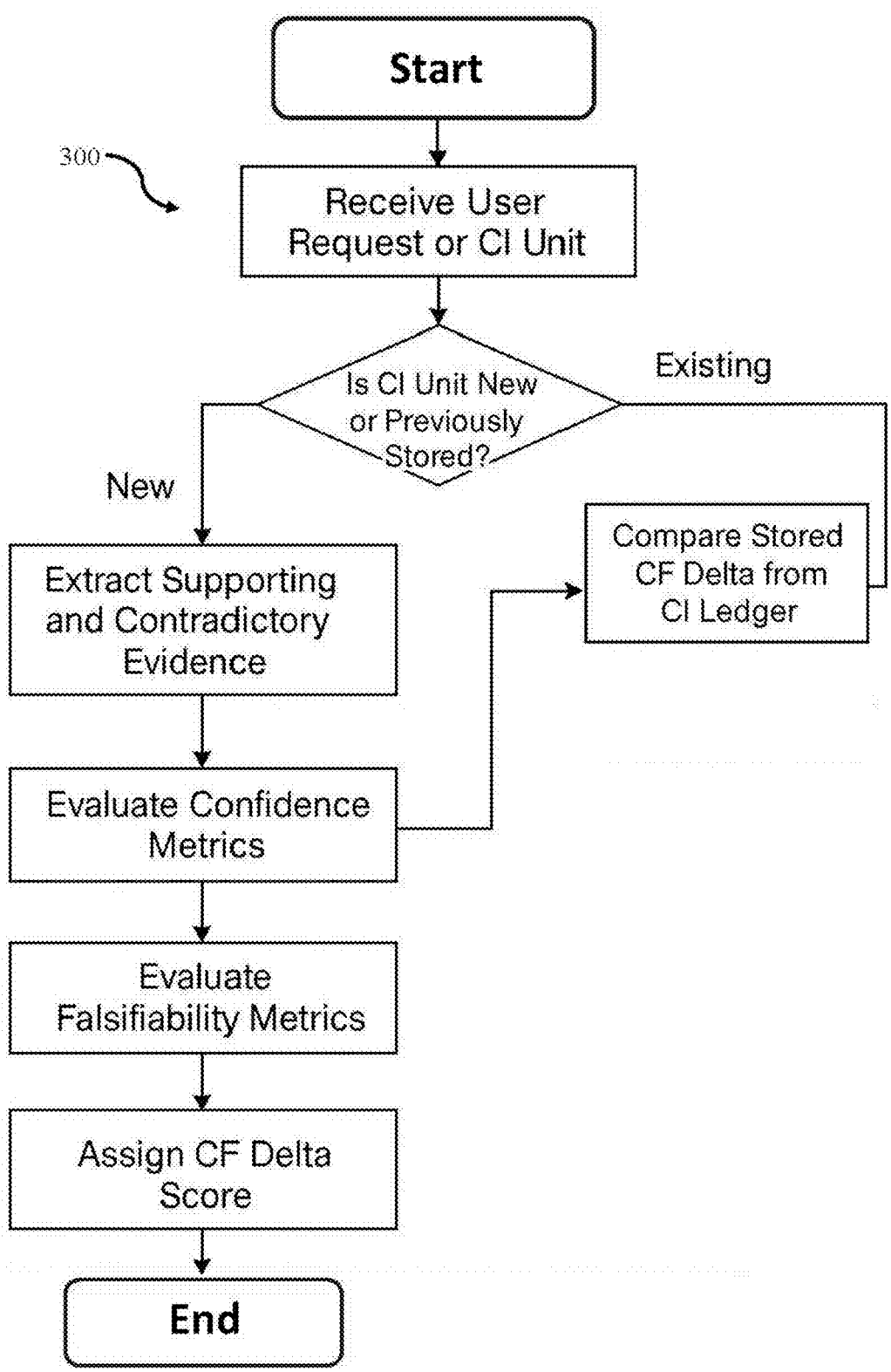
FIG. 3 is an example embodiment of a flow logic for generating cognitive inference units and associated Confidence-falsifiability deltas.

Referring now to FIG. 3, an exemplary embodiment of a flow logic 300 for generating CI units and associated CF deltas is described. In one or more embodiments, flow logic may include a process in which user requests or CI units are received and CF deltas are created for each CI unit. In one or more embodiments, a socratic engine as described in reference to at least FIG. 1, is configured to process user requests and/or generate cognitive inference (CI) units along with associated confidence-falsifiability (CF) deltas through a structured logic flow. In one or more embodiments, the socratic engine may include a multi-stage inference mechanism that iteratively evaluates the content of user requests, matches extracted content to existing inference records, and generates decision-making outputs to be appended to a cognitive inference log (CI log).

With continued reference to FIG. 3, in one or more embodiments, flow logic 300 includes receiving a user request. The user request may include natural language communication, data files, structured inputs, or other user-submitted information as described in this disclosure. Upon receipt, the request is passed to a preprocessing module configured to tokenize, normalize, and parse the input into analyzable units. Preprocessing may include language model-based entity recognition, syntactic decomposition, and semantic filtering.

With continued reference to FIG. 3, flow logic 300 may further includes the step of extracting one or more CI units from the preprocessed user request. These CI units may include declarative statements, user intents, inferred needs, context anchors, or other cognitive inferences that reflect the underlying meaning or assumptions conveyed by the user. Extraction may be performed through rule-based logic, classification algorithms, or trained machine learning models.

With continued reference to FIG. 3, flow logic 300 may further include the step of comparing the extracted CI units with previously stored inference units in a CI log. In some embodiments, this may involve querying the CI log to determine whether the input CI unit is similar to, matches, or contradicts any existing entries. A similarity analysis may be performed using rule-based logic or vector-based matching to generate a similarity score or match decision. With continued reference to FIG. 3, flow logic 300 may further include the step of generating a confidence-falsifiability (CF) delta. The CF delta reflects the system's confidence in the inferred truth or relevance of the extracted CI unit and may be derived based on the structure of the input, existing ledger information, or trained model predictions. The CF delta may include a score, metadata, rationale, or inferred falsifiability risk associated with the input.

With continued reference to FIG. 3, flow logic may further include the step of determining whether the extracted CI unit should be treated as a match to an existing entry or as a novel unit. If a match is determined, the CF delta may be used to update the existing stored inference unit in the CI log, either by replacing, adjusting, or averaging the prior score. If the CI unit is deemed novel, it may be appended to the CI log along with its associated CF delta. In one or more embodiments, logic flow may be implemented with respect to FIGS. 1-3 and without limitation.

Figure 4:
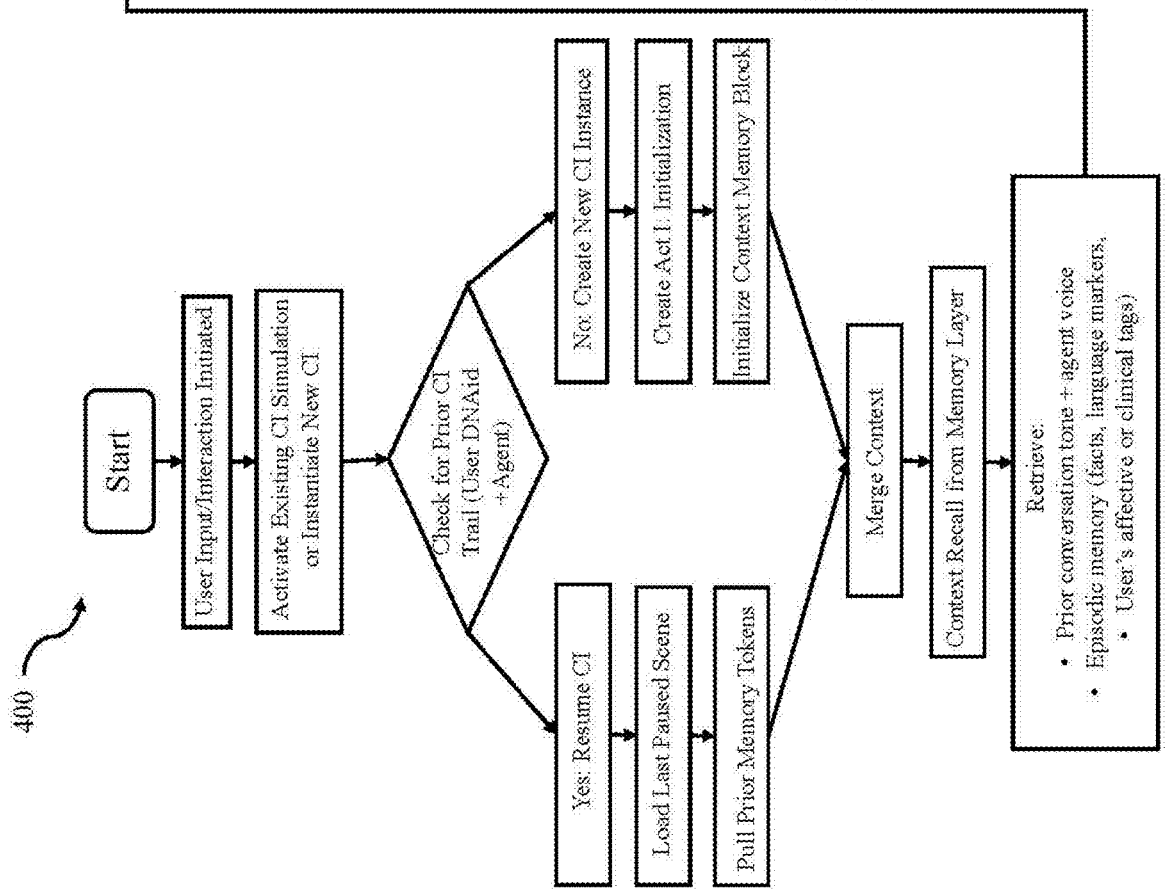
FIG. 4 is a flow diagram illustrating an exemplary embodiment for cognitive inferencing.

Referring now to FIG. 4, a flow diagram 400 illustrating an exemplary embodiment for cognitive inferencing is described. In one or more embodiments, flow diagram 400 include steps to generate LLM outputs, to generate CI units, to generate CF delta and/or the like as described in reference to FIGS. 1-3. In one or more embodiments, the flow diagram may include a step of initiating a system simulation in response to user input or interaction. This initial step may acts as a gateway into the cognitive interface and may involve various forms of multimodal input, such as speech, typed text, facial expression, biometric feedback, or gestures. In one or more embodiments, input may include a user request as described above. In one or more embodiments, a system (such as a system as described in reference to at least FIG. 4) detects the user's engagement intent through these inputs and activates the computational mechanisms responsible for contextualizing and launching the simulation environment. The initiation event is received by the front-end of the simulation interface, which may reside in a local client device, cloud-based runtime environment, or distributed edge node, depending on system architecture and latency optimization needs. This user-initiated interaction is essential for triggering the subsequent retrieval or construction of cognitive context tailored to the individual.

With continued reference to FIG. 4, in one or more embodiments, the flow diagram 400 may include a step of determining whether to activate an existing cognitive interface (CI) simulation or to instantiate a new CI instance. This decision is based on the system's ability to identify the user through a unique identifier referred to as a DNAid (or user identifier as described in reference to FIG. 4), which represents a persistent digital construct comprising behavioral, affective, and cognitive data tied to the user. Upon user reentry, the system checks if there is an active or previously paused CI session associated with this DNAid. If a prior CI trail exists, the system initiates rehydration of the saved state; if not, a new CI thread is initialized from predefined templates or agent blueprints tailored to the user's goals, history, or demographic attributes.

With continued reference to FIG. 4, in one or more embodiments, the flow diagram 400 may include a step of checking for a prior CI trail by querying the system using the user's DNAid in conjunction with the previously associated digital agent, agent profile, CI log and/or avatar. This lookup process searches through a memory layer or decentralized ledger system (such as plurality of CI logs), possibly a quantum ledger, where prior CI threads (CI units) and simulation states are persistently stored. The system compares this record with the incoming DNAid to detect whether a narrative thread exists that can be resumed with context fidelity. If such a trail is found, the simulation will proceed to resume the last scene.

With continued reference to FIG. 4, in one or more embodiments, if a prior CI trail is found, the flow diagram 400 may include a step of resuming the CI session by loading the last paused scene. This involves retrieving a .ci file or simulation snapshot that contains the state of the scene at the point of suspension. The file contains narrative markers, environmental states, agent memory graphs, and user behavior profiles. Alongside scene loading, the system pulls prior memory tokens that were embedded during earlier interactions. These memory tokens are rich semantic units that encode conversational anchors, language preferences, task progress, affective transitions, and episodic recall markers. For example, memory tokens might encode that the user was feeling anxious during a particular session, or that the narrative thread left off during a therapeutic visualization sequence.

With continued reference to FIG. 4, in one or more embodiments, if no prior CI trail exists, the flow diagram 400 may include a step of creating a new CI instance. This may include the generation of CI units as described above. In one or more embodiments, this step launches a baseline cognitive environment in which the user is introduced to a selected or default agent persona. Agent selection may be driven by system-level policies, user preferences, or inferred emotional needs. A new .ci file is created to encapsulate the current interaction thread, narrative context, and environmental parameters. The simulation may initialize default memory structures or load general-purpose contextual models until personalized patterns emerge from the user's input stream.

With continued reference to FIG. 4, in one or more embodiments, the flow diagram 400 may include a step of initializing a context memory block that acts as a live session-specific memory container. This block may incorporate initial affective signals (e.g., detected mood or biometric status), user intent markers, environmental variables (device, location, ambient conditions), and session metadata (agent ID, topic domain, simulation purpose). It is designed to be rapidly accessible and modifiable as the session unfolds and is distributed across low-latency memory for real-time inference tasks. The context memory block is foundational for allowing the system to differentiate between active and dormant session data.

With continued reference to FIG. 4, in one or more embodiments, the flow diagram 400 may include a step of merging the context memory block with deeper layers of memory, including long-term episodic, semantic, and affective memory. This context merge operation ensures continuity of experience and emotional congruence. For instance, if the user previously discussed a deeply personal story with an empathetic agent, that tone and story arc will be reintroduced with consistency. The merge may use attention mechanisms and temporal-contextual filters to prioritize relevant memories. Emotional cadence, narrative trajectory, and task completion state are also assessed and incorporated into the active memory space to preserve experiential fidelity.

With continued reference to FIG. 4, in one or more embodiments, the flow diagram 400 may include a step of recalling information from the memory layer, which may be structured in multi-tier fashion, such as episodic memory (past conversations and significant moments), semantic memory (user's knowledge interests and topics), and affective or clinical tags (markers of emotional or psychological states). These retrieved memory components help restore narrative tone, maintain agent voice consistency, and reflect any therapeutic or cognitive themes that have previously emerged. For example, if a user has expressed interest in meditation, the agent may pick up on that to reintegrate related prompts. Likewise, if the user has an established emotional baseline, this will modulate the agent's voice, pacing, and lexicon.

With continued reference to FIG. 4, in one or more embodiments, the flow diagram 400 may include a step of executing the inference engine, which evaluates user input against the currently active CI narrative and memory context. The inference engine performs multilayered semantic parsing to interpret both explicit and latent user intent. It cross-references the user input with the narrative structure to determine the next best step or response in the simulation. This engine may activate specialized agents based on the scenario. For example, AshaAI might be triggered for emotionally sensitive conversations requiring compassion and therapeutic framing. The inference layer also pulls in external knowledge layers such as domain-specific ontologies, adaptive learning models, and real-time external data feeds to provide up-to-date and coherent responses. The system then selects an output that is emotionally congruent, narratively coherent, and contextually personalized, and sends it to the user via the interaction interface.

With continued reference to FIG. 4, in one or more embodiments, the flow diagram 400 may include a step of entering the CI simulation loop. This loop is the real-time engine that governs ongoing interaction between the user and the CI agent. During this loop, the agent dynamically adapts to new signals, updates its behavior, and continuously modifies the scene and context memory as the user engages. The loop supports multi-turn dialogue, adaptive timing, voice modulation, and avatar animation if applicable. Each new user utterance is processed in light of the current simulation state, and the loop iterates until a termination or pause condition is met.

With continued reference to FIG. 4, in one or more embodiments, the flow diagram 400 may include a step of tracking user-agent interactions in real time. This involves logging interaction signals such as linguistic sentiment, turn-taking latency, facial expressions (if sensors are available), behavioral cues like hesitation or rephrasing, and the emotional arc of the user's communication. This data is used by the agent to update its internal representation of the user's state and can be used to adjust agent tone, switch strategies, or escalate interventions in clinical or educational settings.

With continued reference to FIG. 4, in one or more embodiments, the flow diagram 400 may include a step of updating the simulation scene in the .ci file. This file acts as a real-time ledger of the session's narrative evolution, agent state transitions, user input arcs, environmental modifications, and embedded memory tokens. The file supports continuity across sessions, replay capabilities, and integration with analytic or therapeutic tools. Scene updates may also include visual layout changes, audio environment modulation, or narrative progression markers to guide future inference.

With continued reference to FIG. 4, in one or more embodiments, the flow diagram 400 may include a step of embedding new context into the memory layer. As the simulation continues, new tokens or CI units (representing memory-eligible events) are encoded and written into structured memory spaces. These may include facts learned about the user, new affective patterns detected, language preferences, or situational responses. These tokens are time-stamped, contextually indexed, and linked to other relevant memory structures to enable future retrieval in a way that feels natural and personalized. Emotional intensity, relevance to therapeutic goals, or narrative importance may determine the weight of embedding.

With continued reference to FIG. 4, in one or more embodiments, the flow diagram 400 may include a step of evaluating whether the simulation has ended. This evaluation may occur through user signal (e.g., logout, disengagement), system signal (e.g., a completed narrative arc or task), or emotion modeling (e.g., signs of user fatigue or distress). The system assesses whether continuing would yield diminishing returns or whether pausing would better serve the long-term user relationship.

With continued reference to FIG. 4, in one or more embodiments, if the simulation is ending, the flow diagram 400 may include a step of pausing the simulation. The agent halts ongoing interactions and triggers a preservation process. The entire simulation state (including scene configuration, memory tokens, agent mood, and interaction logs) is serialized and stored.

With continued reference to FIG. 4, in one or more embodiments, the flow diagram 400 may include a step of saving the CI state to a quantum ledger. This ledger provides cryptographically secured, immutable storage of the session's data, enabling trusted retrieval and ensuring that session history cannot be tampered with. The ledger records session provenance, changes in user-agent dynamics, and system-level decisions.

With continued reference to FIG. 4, in one or more embodiments, the flow diagram 400 may include a step of logging interaction metadata, which includes time stamps, semantic summaries, emotional flow of the dialogue, agent decisions, and contextual pivots. These logs support transparency, compliance in clinical applications, and data-driven improvements to agent modeling.

With continued reference to FIG. 4, in one or more embodiments, if the simulation has not ended, the flow diagram 400 may include a step of continuing the simulation loop. The system refreshes its current context with new data from the user, updates agent models, and allows the interaction to proceed naturally, maintaining coherence, emotional sensitivity, and memory continuity. In one or more embodiments, continuing the simulation loop may include resuming from a prior CI trail, wherein the system retrieves a previously stored sequence of CI units from CI ledger that are associated with an earlier inference session or simulation instance. As used herein, resuming from a prior CI trail refers to initializing or extending the current simulation context based on historical inference data, thereby enabling the system to preserve thematic, behavioral, or narrative consistency across sessions. In one or more embodiments, this resumption process may be guided by continuity datum, as described above, which may include metadata fields indicating session linkage, narrative checkpoints, intent carryover markers, or confidence-weighted anchors. The use of continuity datum allows the system to re-establish the prior conversational or cognitive state, ensuring that the resumed simulation remains contextually aligned with prior interactions while incorporating new user inputs and updated agent reasoning. In one or more embodiments, flow diagram may include a step of resigning from prior CI trail or using a new trail. One or more steps of flow diagram 400 may be implemented with reference to FIGS. 1-3.

Figure 5:
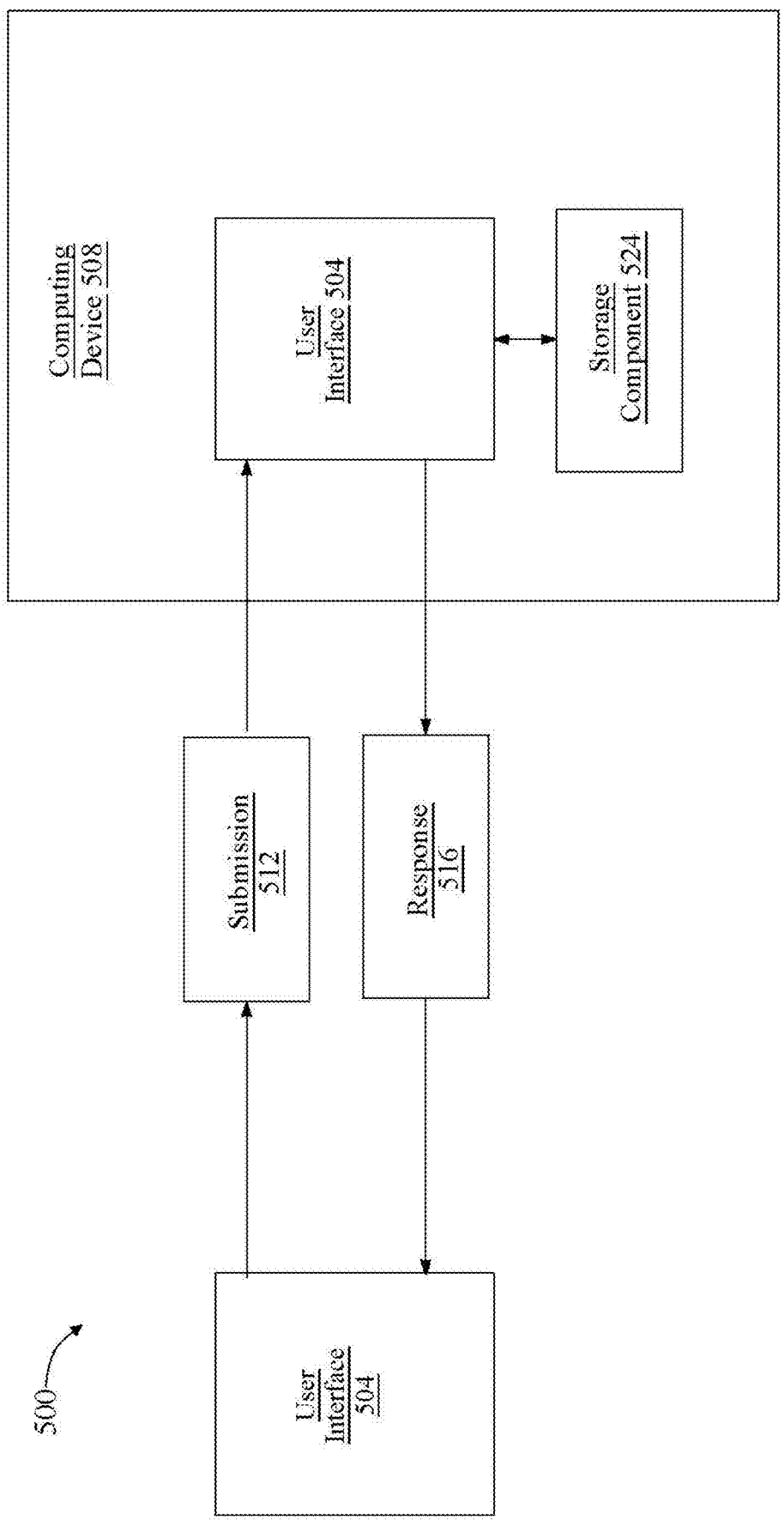
FIG. 5 is an exemplary embodiment of a chatbot system.

Referring to FIG. 5, a chatbot system 500 is schematically illustrated. According to some embodiments, a user interface 504 may be communicative with a computing device 508 that is configured to operate a chatbot. In some cases, user interface 504 may be local to computing device 508. Alternatively or additionally, in some cases, user interface 504 may remote to computing device 508 and communicative with the computing device 508, by way of one or more networks, such as without limitation the internet. Alternatively or additionally, user interface 504 may communicate with user device using telephonic devices and networks, such as without limitation fax machines, short message service (SMS), or multimedia message service (MMS). Commonly, user interface 504 communicates with computing device 508 using text-based communication, for example without limitation using a character encoding protocol, such as American Standard for Information Interchange (ASCII). Typically, a user interface 504 conversationally interfaces a chatbot, by way of at least a submission 512, from the user interface 504 to the chatbot, and a response 516, from the chatbot to the user interface 504. In many cases, one or both of submission 512 and response 516 are text-based communication. Alternatively or additionally, in some cases, one or both of submission 512 and response 516 are audio-based communication.

Continuing in reference to FIG. 5, a submission 512 once received by computing device 508 operating a chatbot, may be processed by a processor. In some embodiments, processor processes a submission 512 using one or more of keyword recognition, pattern matching, and natural language processing. In some embodiments, processor employs real-time learning with evolutionary algorithms. In some cases, processor may retrieve a pre-prepared response from at least a storage component 524, based upon submission 512. Alternatively or additionally, in some embodiments, processor communicates a response 516 without first receiving a submission 512, thereby initiating conversation. In some cases, processor communicates an inquiry to user interface 504; and the processor is configured to process an answer to the inquiry in a following submission 512 from the user interface 504. In some cases, an answer to an inquiry present within a submission 512 from a user device may be used by computing device 104 as an input to another function, for example without limitation at least a static LLM and/or integration layer.

Figure 6:
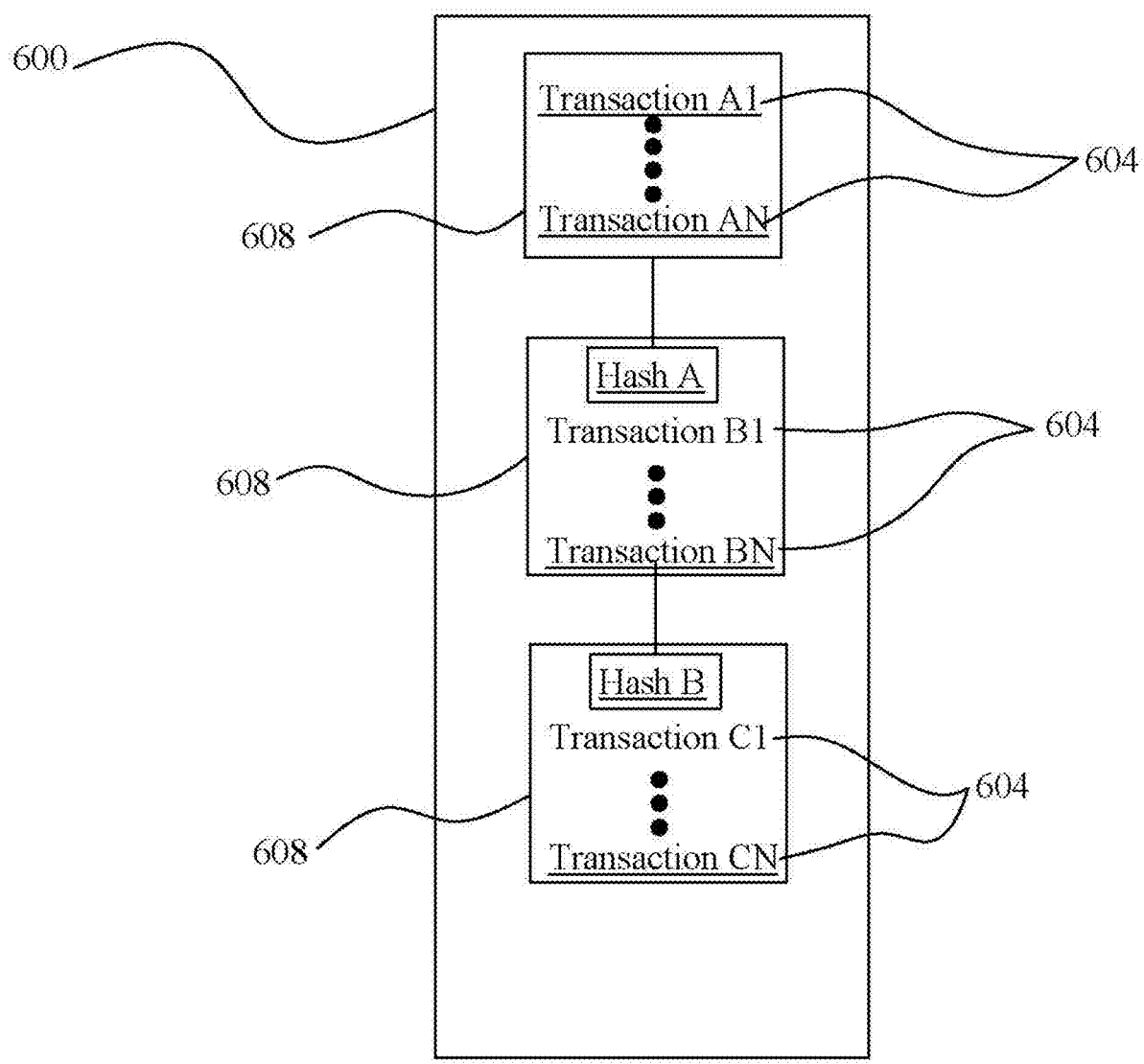
FIG. 6 is an example embodiment of an immutable sequential listing.

Referring now to FIG. 6, an exemplary embodiment of an immutable sequential listing 600 is illustrated. An immutable sequential listing may be, include and/or implement an immutable ledger, where data entries that have been posted to the immutable sequential listing cannot be altered.

Data elements are listing in immutable sequential listing 600; data elements may include any form of data, including textual data, image data, encrypted data, cryptographically hashed data, and the like. Data elements may include, without limitation, one or more at least a digitally signed assertions. In one embodiment, a digitally signed assertion 604 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 604. In an embodiment, collection of textual data states that the owner of a certain transferable item represented in a digitally signed assertion 604 register is transferring that item to the owner of an address. A digitally signed assertion 604 may be signed by a digital signature created using the private key associated with the owner's public key, as described above.

Still referring to FIG. 6, a digitally signed assertion 604 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 604 may describe the transfer of a physical good; for instance, a digitally signed assertion 604 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 604 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 6, in one embodiment, an address is a textual datum identifying the recipient of virtual currency or another item of value in a digitally signed assertion 604. In some embodiments, address is linked to a public key, the corresponding private key of which is owned by the recipient of a digitally signed assertion 604. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 604 may record a subsequent a digitally signed assertion 604 transferring some or all of the value transferred in the first a digitally signed assertion 604 to a new address in the same manner. A digitally signed assertion 604 may contain textual information that is not a transfer of some item of value in addition to, or as an alternative to, such a transfer. For instance, as described in further detail below, a digitally signed assertion 604 may indicate a confidence level associated with a distributed storage node as described in further detail below.

In an embodiment, and still referring to FIG. 6 immutable sequential listing 600 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 600 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 6, immutable sequential listing 600 may preserve the order in which the at least a posted content took place by listing them in chronological order; alternatively or additionally, immutable sequential listing 600 may organize digitally signed assertions 604 into sub-listings 608 such as "blocks" in a blockchain, which may be themselves collected in a temporally sequential order; digitally signed assertions 604 within a sub-listing 608 may or may not be temporally sequential. The ledger may preserve the order in which at least a posted content took place by listing them in sub-listings 608 and placing the sub-listings 608 in chronological order. The immutable sequential listing 600 may be a distributed, consensus-based ledger, such as those operated according to the protocols promulgated by Ripple Labs, inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 600 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.96 standard. In another embodiment, the trusted time ordering is provided by a group of entities collectively acting as the time stamping authority with a requirement that a threshold number of the group of authorities sign the timestamp.

In some embodiments, and with continued reference to FIG. 6, immutable sequential listing 600, once formed, may be inalterable by any party, no matter what access rights that party possesses. For instance, immutable sequential listing 600 may include a hash chain, in which data is added during a successive hashing process to ensure non-repudiation. Immutable sequential listing 600 may include a block chain. In one embodiment, a block chain is immutable sequential listing 600 that records one or more new at least a posted content in a data item known as a sub-listing 608 or "block." An example of a block chain is the BITCOIN block chain used to record BITCOIN transactions and values. Sub-listings 608 may be created in a way that places the sub-listings 608 in chronological order and link each sub-listing 608 to a previous sub-listing 608 in the chronological order so that any computing device may traverse the sub-listings 608 in reverse chronological order to verify any at least a posted content listed in the block chain. Each new sub-listing 608 may be required to contain a cryptographic hash describing the previous sub-listing 608. In some embodiments, the block chain contains a single first sub-listing 608 sometimes known as a "genesis block."

Still referring to FIG. 6, the creation of a new sub-listing 608 may be computationally expensive; for instance, the creation of a new sub-listing 608 may be designed by a "proof of work" protocol accepted by all participants in forming the immutable sequential listing 600 to take a powerful set of computing devices a certain period of time to produce. Where one sub-listing 608 takes less time for a given set of computing devices to produce the sub-listing 608 protocol may adjust the algorithm to produce the next sub-listing 608 so that it will require more steps; where one sub-listing 608 takes more time for a given set of computing devices to produce the sub-listing 608 protocol may adjust the algorithm to produce the next sub-listing 608 so that it will require fewer steps. As an example, protocol may require a new sub-listing 608 to contain a cryptographic hash describing its contents; the cryptographic hash may be required to satisfy a mathematical condition, achieved by having the sub-listing 608 contain a number, called a nonce, whose value is determined after the fact by the discovery of the hash that satisfies the mathematical condition. Continuing the example, the protocol may be able to adjust the mathematical condition so that the discovery of the hash describing a sub-listing 608 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 608 according to the protocol is known as "mining." The creation of a new sub-listing 608 may be designed by a "proof of stake" protocol as will be apparent to those skilled in the art upon reviewing the entirety of this disclosure.

Continuing to refer to FIG. 6, in some embodiments, protocol also creates an incentive to mine new sub-listings 608. The incentive may be financial; for instance, successfully mining a new sub-listing 608 may result in the person or entity that mines the sub-listing 608 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 608 Each sub-listing 608 created in immutable sequential listing 600 may contain a record or at least a posted content describing one or more addresses that receive an incentive, such as virtual currency, as the result of successfully mining the sub-listing 608.

With continued reference to FIG. 6, where two entities simultaneously create new sub-listings 608, immutable sequential listing 600 may develop a fork; protocol may determine which of the two alternate branches in the fork is the valid new portion of the immutable sequential listing 600 by evaluating, after a certain amount of time has passed, which branch is longer. "Length" may be measured according to the number of sub-listings 608 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 608 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 600 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 600.

Still referring to FIG. 6, additional data linked to at least a posted content may be incorporated in sub-listings 608 in the immutable sequential listing 600; for instance, data may be incorporated in one or more fields recognized by block chain protocols that permit a person or computer forming a at least a posted content to insert additional data in the immutable sequential listing 600. In some embodiments, additional data is incorporated in an un-spendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 6, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "altcoin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the 5RP currency of Ripple Labs, inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 608 in a block chain computationally challenging; the incentive for producing sub-listings 608 may include the grant of new crypto currency to the miners. Quantities of crypto currency may be exchanged using at least a posted content as described above.

Figure 7:
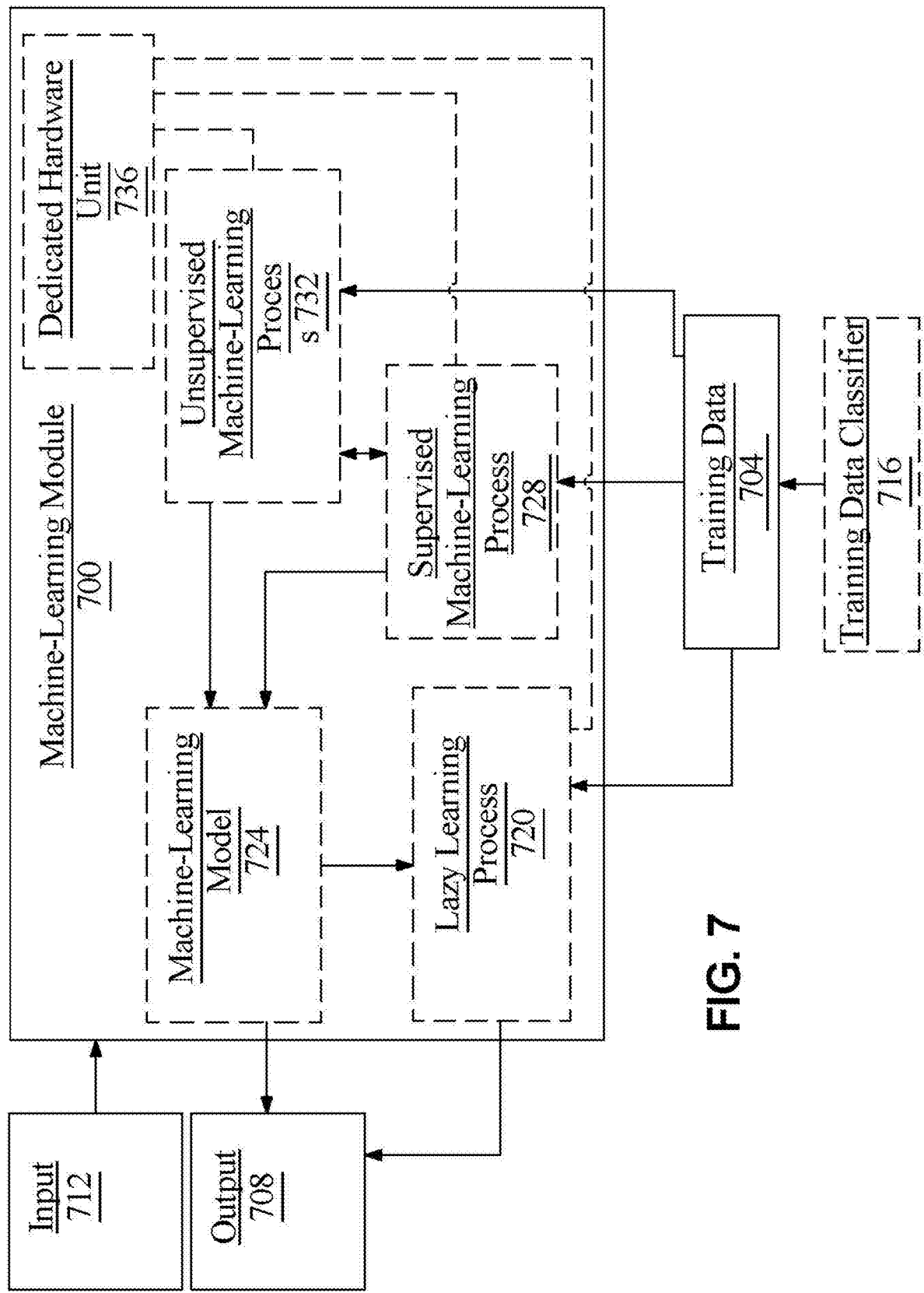
FIG. 7 is a block diagram of exemplary embodiment of a machine learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm instantiated in hardware or software logic, data structures, and/or functions that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example inputs may include user requests and/or CI units and outputs may include CI units and/or CF delta, respectively.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to categories of CI units such as agent profiles, continuity datum and/or the like as described above.

Still referring to FIG. 7, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 7, a computing device may be configured to generate a classifier using a K-nearest neighbors (KNN) algorithm. A "K-nearest neighbors algorithm" as used in this disclosure includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 7, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 7, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 7, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 7, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 7, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 7, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 7, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform down sampling on data. Down sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean upside-effects of compression.

Further referring to FIG. 7, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 7, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation a of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 7, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as user requests or Ci units as described above as inputs, CI units or CF deltas as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

With further reference to FIG. 7, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 7, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 7, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 7, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 732 may not require a response variable; unsupervised processes 732 may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 7, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 7, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 7, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 7, one or more processes or algorithms described above may be performed by at least a dedicated hardware unit 736. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 736 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 736 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 736 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 8:
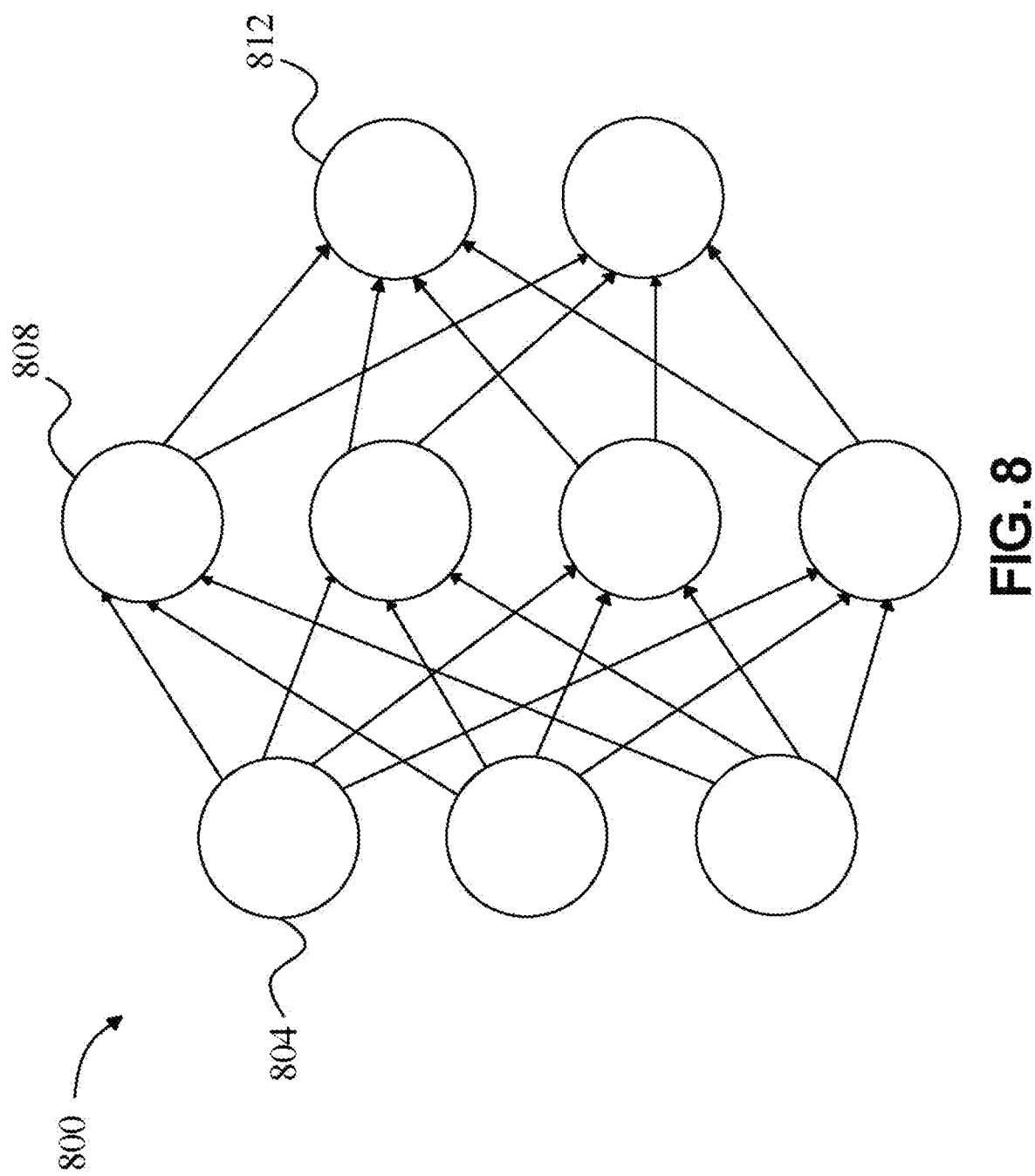
FIG. 8 is a diagram of an exemplary embodiment of a neural network.

Referring now to FIG. 8, an exemplary embodiment of neural network 800 is illustrated. A neural network 800 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 804, one or more intermediate layers 808, and an output layer of nodes 812. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 9:
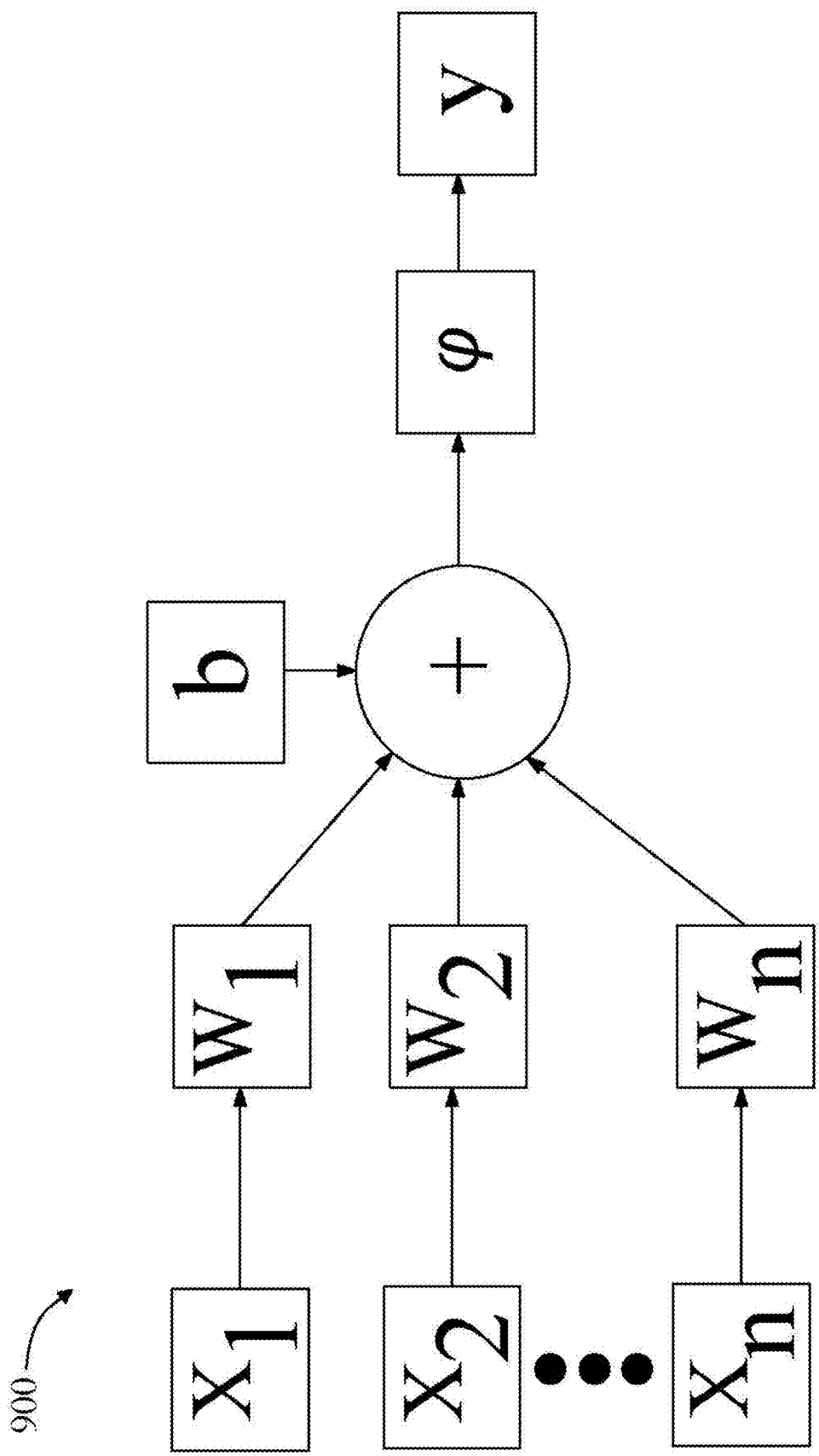
FIG. 9 is a block diagram of an exemplary embodiment of a node of a neural network.

Referring now to FIG. 9, an exemplary embodiment of a node 900 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 10:
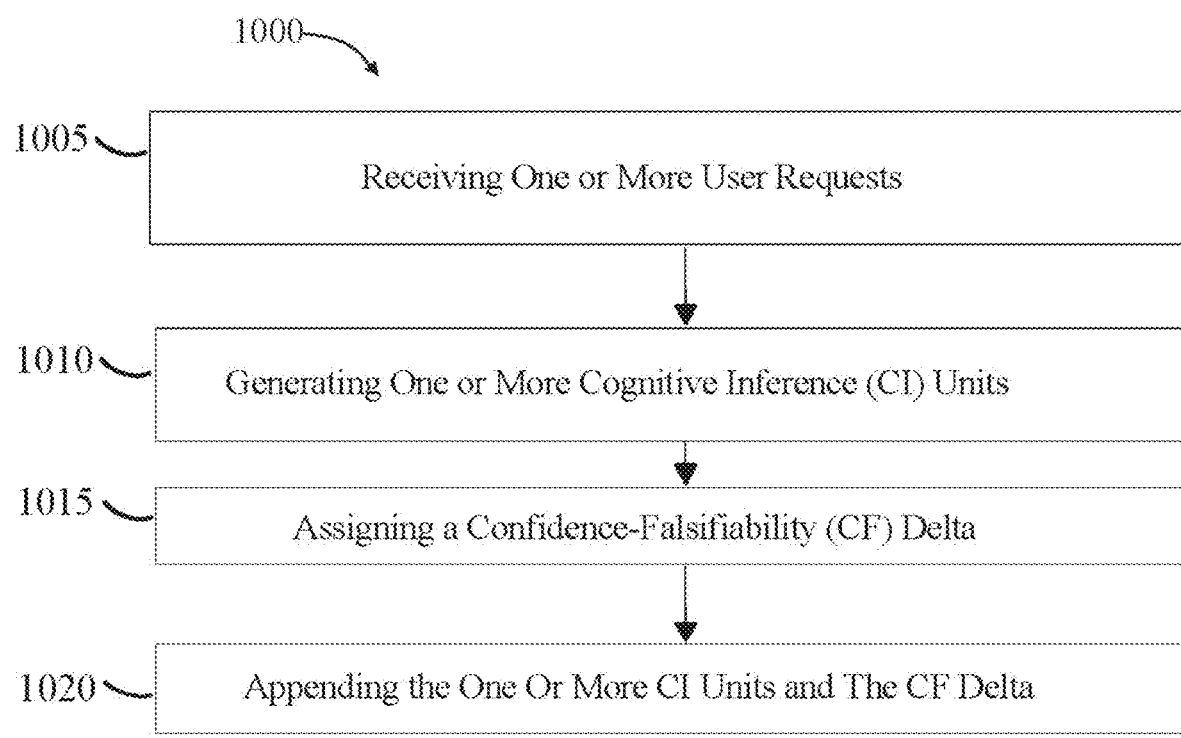
FIG. 10 is a flow diagram illustrating an exemplary embodiment of a method of use for an automated rolling door system.

Referring now to FIG. 10, an exemplary method 1000 for cognitive inferencing for large language models (LLM) is described. In one or more embodiments, at step 1005 method 1000 includes receiving, through a integration layer communicatively connected to a static LLM, one or more user requests from a user, wherein the one or more user requests include a user interaction with the static LLM. This may be implemented with reference to FIGS. 1-9 and without limitation.

With continued reference to FIG. 10, at step 1010 method 1000 includes generating, by a processor, one or more cognitive inference (CI) units from the one or more user requests. This may be implemented with reference to FIGS. 1-9 and without limitation.

With continued reference to FIG. 10, at step 1015 method 1000 includes assigning, by the processor, a confidence-falsifiability (CF) delta for each of the one or more CI units using a socratic engine. This may be implemented with reference to FIGS. 1-9 and without limitation.

With continued reference to FIG. 10, at step 1020, method 1000 includes appending, by the processor, the one or more CI units and the CF delta to a cognitive inference (CI) log associated with the user, wherein the CI log serves as an inference engine for the static LLM and wherein the integration layer is configured to query the CI log upon a subsequent user interaction with the static LLM. This may be implemented with reference to FIGS. 1-9 and without limitation.

With continued reference to FIG. 10, in one or more embodiments, the CI log is stored on an immutable sequential listing. In one or more embodiments, the CI log includes a plurality of stored inference units. In one or more embodiments, the method further includes appending, by the integration layer, the plurality of stored inference units to a subsequent user input as a contextual prompt for the static LLM. In one or more embodiments, at least one CI unit of the one or more CI units includes a continuity datum associated with the user interaction. In one or more embodiments, receiving one or more user requests from a user includes identifying a user identifier associated with the one or more user requests and appending the one or more CI units and the CF delta to CI log includes identifying one CI log associated with the user identifier from a plurality of CI logs, wherein each CI log of the plurality of CI logs is associated with a differing user. In one or more embodiments, the CI log includes an agent profile, wherein the agent profile defines a role for the static LLM. In one or more embodiments, the agent profile includes a care provider. In one or more embodiments, assigning the CF delta for each of the one or more CI units includes retrieving a plurality of stored inference units from the CI log, comparing the one or more CI units to the plurality of stored inference units to identify a confidence level of each CI unit of the one or more CI units and assigning the CF delta as a function of the confidence level. In one or more embodiments, appending the one or more CI units and the CF delta to the CI log includes updating a stored delta for one or more stored inference units within the CI log as a function of the CF delta and the one or more CI units. In one or more embodiments, the CI log includes a smart contract configured to bind each CI log of a plurality of CI logs to a dedicated user, and wherein the smart contract includes a plurality of historical log modifications associated with the CI log. In one or more embodiments, wherein generating one or more CI units from the one or more user requests includes identifying a user identifier and an agent identifier within one or more user requests, querying a database including a plurality of CI logs using the user identifier and the agent identifier and initializing a new CI log including an initialized agent profile as a function of the query, the user identifier and the agent identifier. In one or more embodiments, at least one CI unit of the one or more CI units includes a simulation continuity flag configured to enable reentry into a prior CI trail checkpoint associated with a previous user-agent interaction. In one or more embodiments, the method further includes retrieving, displaying, and documenting, using a simulation rendering interface, prior CI sequences for review. In one or more embodiments, the CF Delta is subject to a real-time adjustment based on external validation signals. In one or more embodiments, agent identifier corresponds to a fiduciary agent with a defined bounded behavioral scope, persistent memory constraints, and audit-linked simulation continuity. In one or more embodiments, method further includes replaying, using an interface layer configured stored inference sessions. This may be implemented with reference to FIGS. 1-9 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
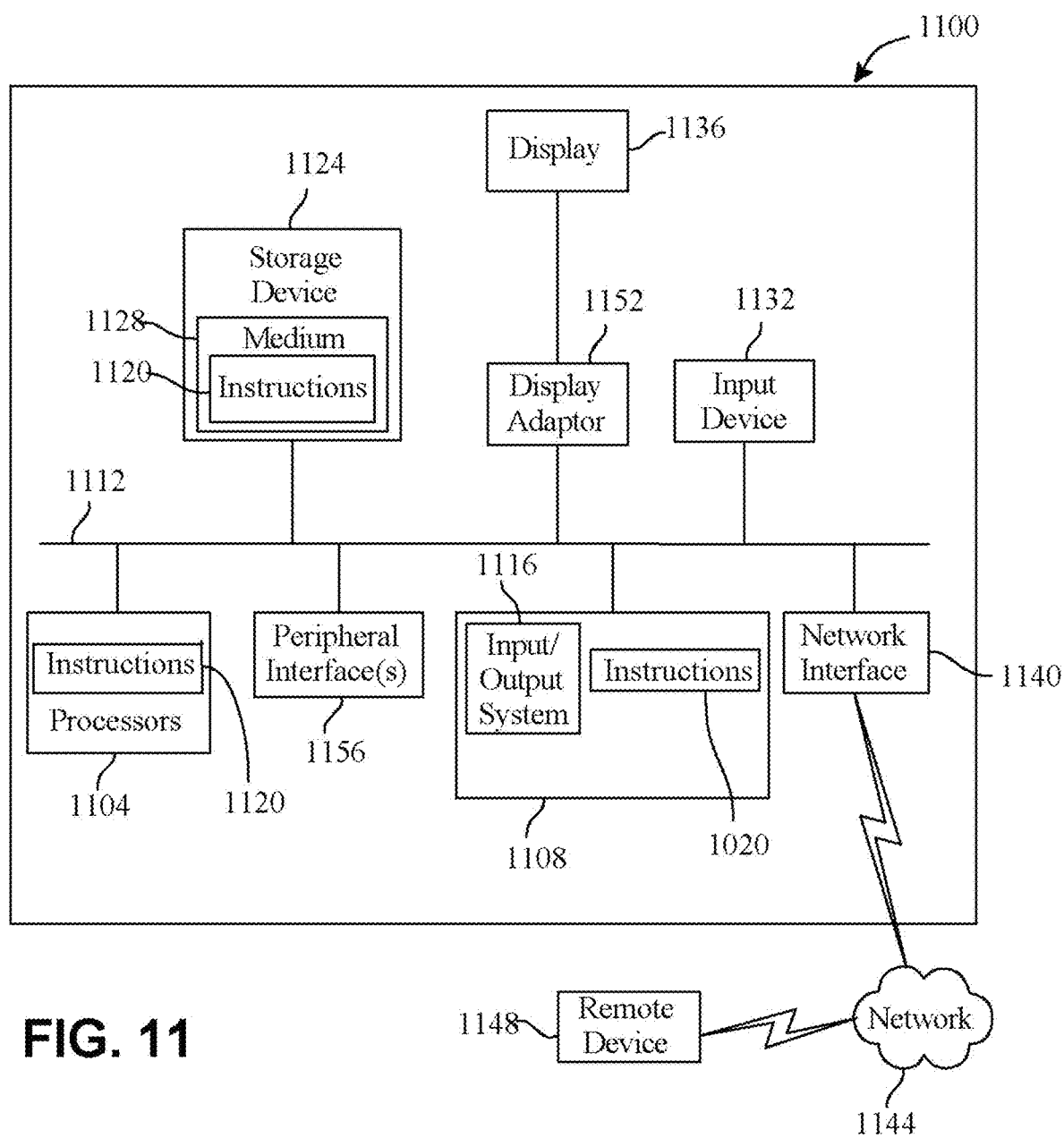
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof. Memory 1108 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In some embodiments, storage device 1124 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display 1136. Examples of a display device include, but are not limited to, a liquid crystal display (LCD), a cathode ray tube (CRT), a plasma display, a light emitting diode (LED) display, and any combinations thereof. Display adapter 1152 and display 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

Further referring to FIG. 11, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 11, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 11, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In one or more embodiments, one or more of computing system 1100, processor 1104, and memory 1108 may be virtualized; that is, a virtual machine and/or container may interact directly with such computing system 1100, processor 1104, and/or memory 1108, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component and/or (2) a portion of one or more components working as though it were a complete (virtual) component. For instance, where processor 1104 comprises a plurality of processors and/or processor cores, virtualization may, in one or more embodiments, simulate or emulate a single (virtual) processor whose functions are allocated to one or more of the plurality of processors and/or processor cores. In this case, while processor 1104 may be said to be virtualized, the processor 1104, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for cognitive inferencing for large language models (LLMs), the system comprising:
   an integration layer communicatively connected to a static LLM, wherein the integration layer comprises:
      a processor; and
      a memory communicatively connected to the processor, the memory containing instructions configuring the processor to:
         receive, through the integration layer, one or more user requests from a user, wherein the one or more user requests comprise a user interaction with the static LLM;
         generate one or more cognitive inference (CI) units from the one or more user requests;
         assign a confidence-falsifiability (CF) delta for each of the one or more CI units using a Socratic engine; and
         append the one or more CI units and the CF delta to a cognitive inference (CI) log associated with the user, wherein the CI log serves as an inference engine for the static LLM;
   wherein the integration layer is configured to query the CI log upon a subsequent user interaction with the static LLM.

2. The system of claim 1, wherein the CI log is stored on an immutable sequential listing.

3. The system of claim 1, wherein the CI log comprises a plurality of stored inference units, and wherein the integration layer is further configured to append the plurality of stored inference units to a subsequent user input as a contextual prompt for the static LLM.

4. The system of claim 1, wherein generating one or more CI units from the one or more user requests comprises:
   identifying a user identifier and an agent identifier within one or more user requests;
   querying a database comprising a plurality of CI logs using the user identifier and the agent identifier; and
   initializing a new CI log comprising an initialized agent profile as a function of the query, the user identifier and the agent identifier.

5. The system of claim 4, wherein the agent identifier corresponds to a fiduciary agent with a defined bounded behavioral scope, persistent memory constraints, and audit-linked simulation continuity.

6. The system of claim 1, wherein:
   receiving one or more user requests from a user comprises:
      identifying a user identifier associated with the one or more user requests; and
      appending the one or more CI units and the CF delta to CI log comprises identifying one CI log associated with the user identifier from a plurality of CI logs, wherein each CI log of the plurality of CI logs is associated with a differing user.

7. The system of claim 1, wherein the CI log comprises an agent profile, wherein the agent profile defines a role for the static LLM, wherein the agent profile comprises a care provider.

8. The system of claim 1, wherein assigning the CF delta for each of the one or more CI units comprises:
   retrieving a plurality of stored inference units from the CI log;
   comparing the one or more CI units to the plurality of stored inference units to identify a confidence level of each CI unit of the one or more CI units; and
   assigning the CF delta as a function of the confidence level.

9. The system of claim 1, appending the one or more CI units and the CF delta to the CI log comprises updating a stored delta for one or more stored inference units within the CI log as a function of the CF delta and the one or more CI units.

10. The system of claim 1, wherein the CI log comprises a smart contract configured to bind each CI log of a plurality of CI logs to a dedicated user, and wherein the smart contract comprises a plurality of historical log modifications associated with the CI log.

11. The system of claim 1, wherein at least one CI unit of the one or more CI units comprises a continuity datum associated with the user interaction.

12. The system of claim 1, wherein the system further comprises an interface layer configured to replay stored inference sessions.

13. The system of claim 1, wherein at least one CI unit of the one or more CI units comprises a simulation continuity flag configured to enable reentry into a prior CI trail checkpoint associated with a previous user-agent interaction.

14. The system of claim 1, the system further comprising a simulation rendering interface configured to retrieve, display, and document prior CI sequences for review.

15. The system of claim 1, wherein the CF delta is subject to a real-time adjustment based on external validation signals.

16. A method for cognitive inferencing for large language models (LLMs), the method comprising:
   receiving, through an integration layer communicatively connected to a static LLM, one or more user requests from a user, wherein the one or more user requests comprise a user interaction with the static LLM;
   generating, by a processor, one or more cognitive inference (CI) units from the one or more user requests;
   assigning, by the processor, a confidence-falsifiability (CF) delta for each of the one or more CI units using a Socratic engine; and
   appending, by the processor, the one or more CI units and the CF delta to a cognitive inference (CI) log associated with the user, wherein the CI log serves as an inference engine for the static LLM and wherein the integration layer is configured to query the CI log upon a subsequent user interaction with the static LLM.

17. The method of claim 16, wherein the CI log is stored on an immutable sequential listing.

18. The method of claim 16, wherein:
   the CI log comprises a plurality of stored inference units; and the method further comprises appending, by the integration layer, the plurality of stored inference units to a subsequent user input as a contextual prompt for the static LLM.

19. The method of claim 16, wherein generating one or more CI units from the one or more user requests comprises:
    identifying a user identifier and an agent identifier within one or more user requests;
    querying a database comprising a plurality of CI logs using the user identifier and the agent identifier; and
    initializing a new CI log comprising an initialized agent profile as a function of the query, the user identifier and the agent identifier.

20. The method of claim 19, wherein the agent identifier corresponds to a fiduciary agent with a defined bounded behavioral scope, persistent memory constraints, and audit-linked simulation continuity.

21. The method of claim 16, wherein:
    receiving one or more user requests from a user comprises identifying a user identifier associated with the one or more user requests; and
    appending the one or more CI units and the CF delta to CI log comprises identifying one CI log associated with the user identifier from a plurality of CI logs, wherein each CI log of the plurality of CI logs is associated with a differing user.

22. The method of claim 16, wherein the CI log comprises an agent profile, wherein the agent profile defines a role for the static LLM, wherein the agent profile comprises a care provider.

23. The method of claim 16, wherein assigning the CF delta for each of the one or more CI units comprises:
    retrieving a plurality of stored inference units from the CI log;
    comparing the one or more CI units to the plurality of stored inference units to identify a confidence level of each CI unit of the one or more CI units; and
    assigning the CF delta as a function of the confidence level.

24. The method of claim 16, appending the one or more CI units and the CF delta to the CI log comprises updating a stored delta for one or more stored inference units within the CI log as a function of the CF delta and the one or more CI units.

25. The method of claim 16, wherein the CI log comprises a smart contract configured to bind each CI log of a plurality of CI logs to a dedicated user, and wherein the smart contract comprises a plurality of historical log modifications associated with the CI log.

26. The method of claim 16, wherein at least one CI unit of the one or more CI units comprises a continuity datum associated with the user interaction.

27. The method of claim 16, the method further comprising replaying, using an interface layer, stored inference sessions.

28. The method of claim 16, wherein at least one CI unit of the one or more CI units comprises a simulation continuity flag configured to enable reentry into a prior CI trail checkpoint associated with a previous user-agent interaction.

29. The method of claim 16, the method further comprising retrieving, displaying and documenting, using a simulation rendering interface, prior CI sequences for review.

30. The method of claim 16, wherein the CF delta is subject to a real-time adjustment based on external validation signals.

* * * * *